United States Patent
Yang et al.

(10) Patent No.: US 10,863,510 B2
(45) Date of Patent: Dec. 8, 2020

(54) PER STREAM AND PER ANTENNA CYCLIC SHIFT DELAY IN WIRELESS COMMUNICATIONS AND UPLINK MULTI-USER MIMO

(71) Applicant: QUALCOMM Incorporated, San Diego, CA (US)

(72) Inventors: Lin Yang, San Diego, CA (US); Bin Tian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/400,649

(22) Filed: Jan. 6, 2017

(65) Prior Publication Data
US 2017/0201975 A1     Jul. 13, 2017

Related U.S. Application Data

(60) Provisional application No. 62/334,295, filed on May 10, 2016, provisional application No. 62/276,671, filed on Jan. 8, 2016.

(51) Int. Cl.
*H04B 7/04* (2017.01)
*H04W 72/04* (2009.01)
(Continued)

(52) U.S. Cl.
CPC ........ *H04W 72/046* (2013.01); *H04B 7/0452* (2013.01); *H04B 7/0671* (2013.01);
(Continued)

(58) Field of Classification Search
CPC .. H04W 72/046; H04W 88/08; H04B 7/0671; H04B 7/0452; H04L 69/22; H04L 69/324
See application file for complete search history.

(56) References Cited

U.S. PATENT DOCUMENTS

| | | | |
|---|---|---|---|
| 2011/0305194 A1* | 12/2011 | Zheng | H04B 7/0452 370/328 |
| 2012/0176981 A1* | 7/2012 | Baldemair | H04B 7/0413 370/329 |

(Continued)

FOREIGN PATENT DOCUMENTS

WO     2011003433 A1     1/2011

OTHER PUBLICATIONS

International Search Report and Written Opinion—PCT/US2017/012645—ISA/EPO—dated Mar. 23, 2017.

*Primary Examiner* — Lakeram Jangbahadur
(74) *Attorney, Agent, or Firm* — Kevin M. Donnelly; Arent Fox, LLP

(57) ABSTRACT

A method, an apparatus, and a computer-readable medium for wireless communication are provided. In one aspect, the apparatus may determine whether to transmit a frame with CSDs based on a number of antennas, a number of streams, or both. In another aspect, the apparatus may determine a first set of CSD values for transmitting a first set of information associated with a first portion of the frame. In a further aspect, the apparatus may determine a second set of CSD values for transmitting a second set of information associated with a second portion of the frame. In yet another aspect, the apparatus may transmit the first set of information based on the first set of CSD values and the second set of information based on the second set of CSD values using the number of antennas, the number of streams, or both.

17 Claims, 10 Drawing Sheets

(51) Int. Cl.
  *H04B 7/0452* (2017.01)
  *H04L 29/06* (2006.01)
  *H04L 29/08* (2006.01)
  *H04B 7/06* (2006.01)
  *H04W 88/08* (2009.01)

(52) U.S. Cl.
  CPC ............ *H04L 69/22* (2013.01); *H04L 69/324* (2013.01); *H04W 88/08* (2013.01)

(56) References Cited

U.S. PATENT DOCUMENTS

2013/0142275 A1    6/2013  Baik et al.
2014/0328335 A1*  11/2014  Zhang ................ H04W 28/065
                                                        370/338
2015/0289147 A1*  10/2015  Lou ...................... H04B 7/0408
                                                        370/329
2017/0099089 A1*   4/2017  Liu ........................ H04B 7/028

* cited by examiner

PER STREAM AND PER ANTENNA CYCLIC SHIFT DELAY IN WIRELESS COMMUNICATIONS AND UPLINK MULTI-USER MIMO

CROSS-REFERENCE TO RELATED APPLICATION(S)

This application claims the benefit of U.S. Provisional Application Ser. No. 62/276,671, entitled "PER STREAM AND PER ANTENNA CYCLIC SHIFT DELAY IN WIRELESS COMMUNICATIONS AND UPLINK MULTI-USER MIMO" and filed on Jan. 8, 2016, which is expressly incorporated by reference herein in its entirety. In addition, this application claims the benefit of U.S. Provisional Application Ser. No. 62/334,295, entitled "PER STREAM AND PER ANTENNA CYCLIC SHIFT DELAY IN WIRELESS COMMUNICATIONS AND UPLINK MULTI-USER MIMO" and filed on May 10, 2016, which is expressly incorporated by reference herein in its entirety.

BACKGROUND

Field

The present disclosure relates generally to communication systems, and more particularly, to per stream and per antenna cyclic shift delay (CSD) in wireless transmissions and uplink multi-user (MU) multiple-input-multiple-output (MIMO) transmissions.

Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, Synchronous Optical Networking (SONET), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc., frequency bands. Wireless networks advantageously facilitate user mobility and rapid field deployment when compared to fixed wired networks.

SUMMARY

The systems, methods, computer-readable media, and devices of the invention each have several aspects, no single one of which is solely responsible for the desirable attributes of the invention. Without limiting the scope of this invention as expressed by the claims which follow, some features will now be discussed briefly. After considering this discussion, and particularly after reading the section entitled "Detailed Description," one will understand how the features of this invention provide advantages for devices in a wireless network.

One aspect of this disclosure provides an apparatus (e.g., a station) for wireless communication. In one aspect, the apparatus may determine whether to transmit a frame with CSDs based on a number of antennas at the station for transmitting the frame, a number of streams used to transmit the frame by the station, or both the number of antennas at the station for transmitting the frame and the number of streams used to transmit the frame by the station. In another aspect, the apparatus may determine a first set of CSD values for transmitting a first set of information associated with a first portion of the frame based on whether it is determined to transmit the frame with the CSDs based on the number of antennas at the station for transmitting the frame, the number of streams used to transmit the frame by the station, or both the number of antennas at the station for transmitting the frame and the number of streams used to transmit the frame by the station. In a further aspect, the apparatus may determine a second set of CSD values for transmitting a second set of information associated with a second portion of the frame based on whether it is determined to transmit the frame with the CSDs based on the number of antennas at the station for transmitting the frame, the number of streams used to transmit the frame by the station, or both the number of antennas at the station for transmitting the frame and the number of streams used to transmit the frame by the station. In yet another aspect, the apparatus may transmit the first set of information based on the first set of CSD values and the second set of information based on the second set of CSD values using the number of antennas, the number of streams, or both the number of antennas and the number of streams.

DETAILED DESCRIPTION

Figure 1:
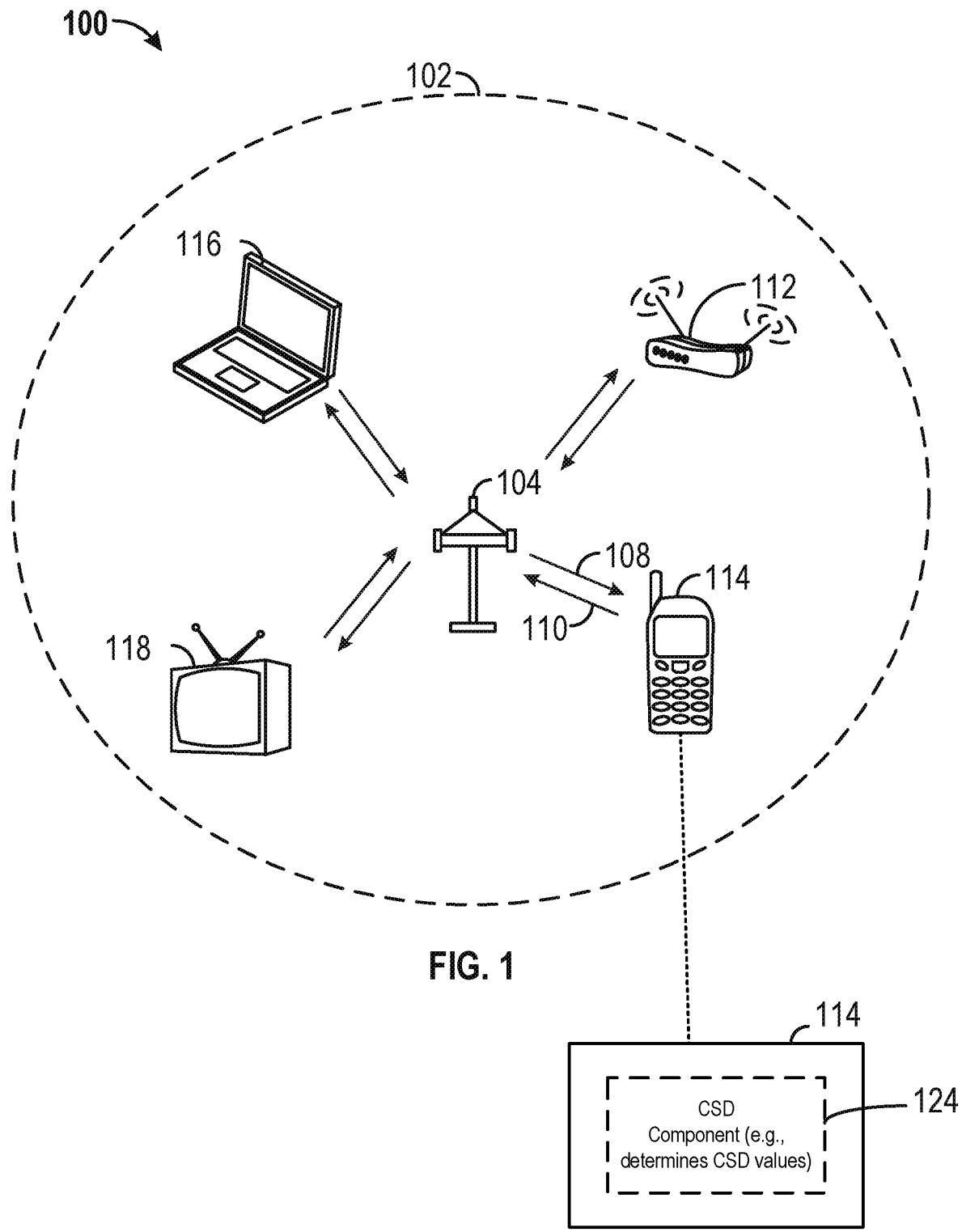
FIG. 1 shows an example wireless communication system in which aspects of the present disclosure may be employed.

Various aspects of the novel systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, computer program products, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of WLANs. A WLAN may be used to interconnect nearby devices together, employing widely used networking protocols. The various aspects described herein may apply to any communication standard, such as a wireless protocol.

In some aspects, wireless signals may be transmitted according to an 802.11 protocol using orthogonal frequency-division multiplexing (OFDM), direct-sequence spread spectrum (DSSS) communications, a combination of OFDM and DSSS communications, or other schemes. Implementations of the 802.11 protocol may be used for sensors, metering, and smart grid networks. Advantageously, aspects of certain devices implementing the 802.11 protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be two types of devices: access points (APs) and clients (also referred to as stations or "STAs"). In general, an AP may serve as a hub or base station for the WLAN and a STA serves as a user of the WLAN. For example, a STA may be a laptop computer, a personal digital assistant (PDA), a mobile phone, etc. In an example, a STA connects to an AP via a Wi-Fi (e.g., IEEE 802.11 protocol) compliant wireless link to obtain general connectivity to the Internet or to other wide area networks. In some implementations a STA may also be used as an AP.

An access point may also comprise, be implemented as, or known as a NodeB, Radio Network Controller (RNC), eNodeB, Base Station Controller (BSC), Base Transceiver Station (BTS), Base Station (BS), Transceiver Function (TF), Radio Router, Radio Transceiver, connection point, or some other terminology.

A station may also comprise, be implemented as, or known as an access terminal (AT), a subscriber station, a subscriber unit, a mobile station, a remote station, a remote terminal, a user terminal, a user agent, a user device, a user equipment, or some other terminology. In some implementations, a station may comprise a cellular telephone, a cordless telephone, a Session Initiation Protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

In an aspect, MIMO schemes may be used for wide area WLAN (e.g., Wi-Fi) connectivity. MIMO exploits a radio-wave characteristic called multipath. In multipath, transmitted data may bounce off objects (e.g., walls, doors, furniture), reaching the receiving antenna multiple times through different routes and at different times. A WLAN device that employs MIMO will split a data stream into multiple parts, called spatial streams (or multi-streams), and transmit each spatial stream through separate antennas to corresponding antennas on a receiving WLAN device.

The term "associate," or "association," or any variant thereof should be given the broadest meaning possible within the context of the present disclosure. By way of example, when a first apparatus associates with a second apparatus, it should be understood that the two apparatuses may be directly associated or intermediate apparatuses may be present. For purposes of brevity, the process for establishing an association between two apparatuses will be described using a handshake protocol that requires an "association request" by one of the apparatus followed by an "association response" by the other apparatus. It will be understood by those skilled in the art that the handshake protocol may require other signaling, such as by way of example, signaling to provide authentication.

Any reference to an element herein using a designation such as "first," "second," and so forth does not generally limit the quantity or order of those elements. Rather, these designations are used herein as a convenient method of distinguishing between two or more elements or instances of an element. Thus, a reference to first and second elements does not mean that only two elements can be employed, or that the first element must precede the second element. In addition, a phrase referring to "at least one of" a list of items refers to any combination of those items, including single members. As an example, "at least one of: A, B, or C" is intended to cover: A, or B, or C, or any combination thereof (e.g., A-B, A-C, B-C, and A-B-C).

As discussed above, certain devices described herein may implement the 802.11 standard, for example. Such devices, whether used as a STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

FIG. 1 shows an example wireless communication system 100 in which aspects of the present disclosure may be employed. The wireless communication system 100 may operate pursuant to a wireless standard, for example the IEEE 802.11 standard. The wireless communication system 100 may include an AP 104, which communicates with STAs (e.g., STAs 112, 114, 116, and 118).

A variety of processes and methods may be used for transmissions in the wireless communication system 100 between the AP 104 and the STAs. For example, signals may be sent and received between the AP 104 and the STAs in accordance with OFDM/OFDMA techniques. If this is the case, the wireless communication system 100 may be referred to as an OFDM/OFDMA system. Alternatively, signals may be sent and received between the AP 104 and the STAs in accordance with CDMA techniques. If this is the case, the wireless communication system 100 may be referred to as a CDMA system.

A communication link that facilitates transmission from the AP 104 to one or more of the STAs may be referred to as a downlink (DL) 108, and a communication link that facilitates transmission from one or more of the STAs to the AP 104 may be referred to as an uplink (UL) 110. Alternatively, a downlink 108 may be referred to as a forward link or a forward channel, and an uplink 110 may be referred to as a reverse link or a reverse channel. In some aspects, DL communications may include unicast or multicast traffic indications.

The AP 104 may suppress adjacent channel interference (ACI) in some aspects so that the AP 104 may receive UL communications on more than one channel simultaneously without causing significant analog-to-digital conversion (ADC) clipping noise. The AP 104 may improve suppression of ACI, for example, by having separate finite impulse response (FIR) filters for each channel or having a longer ADC backoff period with increased bit widths.

The AP 104 may act as a base station and provide wireless communication coverage in a basic service area (BSA) 102. A BSA (e.g., the BSA 102) is the coverage area of an AP (e.g., the AP 104). The AP 104 along with the STAs associated with the AP 104 and that use the AP 104 for communication may be referred to as a basic service set (BSS). It should be noted that the wireless communication system 100 may not have a central AP (e.g., AP 104), but rather may function as a peer-to-peer network between the STAs. Accordingly, the functions of the AP 104 described herein may alternatively be performed by one or more of the STAs.

The AP 104 may transmit on one or more channels (e.g., multiple narrowband channels, each channel including a frequency bandwidth) and/or a beacon signal (or simply a "beacon"), via a communication link such as the downlink 108, to other nodes (STAs) of the wireless communication system 100, which may help the other nodes (STAs) to synchronize timing with the AP 104, or which may provide other information or functionality. Such beacons may be transmitted periodically. In one aspect, the period between successive transmissions may be referred to as a superframe. Transmission of a beacon may be divided into a number of groups or intervals. In one aspect, the beacon may include, but is not limited to, such information as timestamp information to set a common clock, a peer-to-peer network identifier, a device identifier, capability information, a superframe duration, transmission direction information, reception direction information, a neighbor list, and/or an extended neighbor list, some of which are described in additional detail below. Thus, a beacon may include information that is both common (e.g., shared) amongst several devices and specific to a given device.

In some aspects, a STA (e.g., STA 114) may be required to associate with the AP 104 in order to send communications to and/or to receive communications from the AP 104. In one aspect, association information may be included in a beacon broadcast by the AP 104. To receive such a beacon, the STA 114 may, for example, perform a broad coverage search over a coverage region. A search may also be performed by the STA 114 by sweeping a coverage region in a lighthouse fashion, for example. After receiving the association information, the STA 114 may transmit a reference signal, such as an association probe or request, to the AP 104. In some aspects, the AP 104 may use backhaul services, for example, to communicate with a larger network, such as the Internet or a public switched telephone network (PSTN).

In an aspect, the STA 114 may transmit a frame (e.g., signal) to the AP 104 using a number of antennas, a number of streams, or both a number of antennas and a number of streams at the STA 114. However, because different streams and/or by different antennas may be used to transmit the signal using the same channel, unintentional beamforming may result when the signals are received at the AP 104 and are opposite in phase. To avoid unintentional beamforming, the STA 114 of the present disclosure may apply a CSD for each stream and/or antenna used to transmit the frame so that the channels may be more easily differentiated by the AP 104.

For example, the STA 114 of the present disclosure may include a CSD component 124 configured to determine a first set of CSD values (e.g., see Table 1 infra) for transmitting a first set of information associated with a first portion of a frame. The CSD component 124 may be configured to determine a second set of CSD values (e.g., see Table 2 infra) for transmitting a second set of information associated with a second portion of the frame. The CSD component 124 may be configured to transmit the first set of information based on the first set of CSD values and the second set of information based on the second set of CSD values so that unintentional beamforming may be avoided.

Figure 2A:
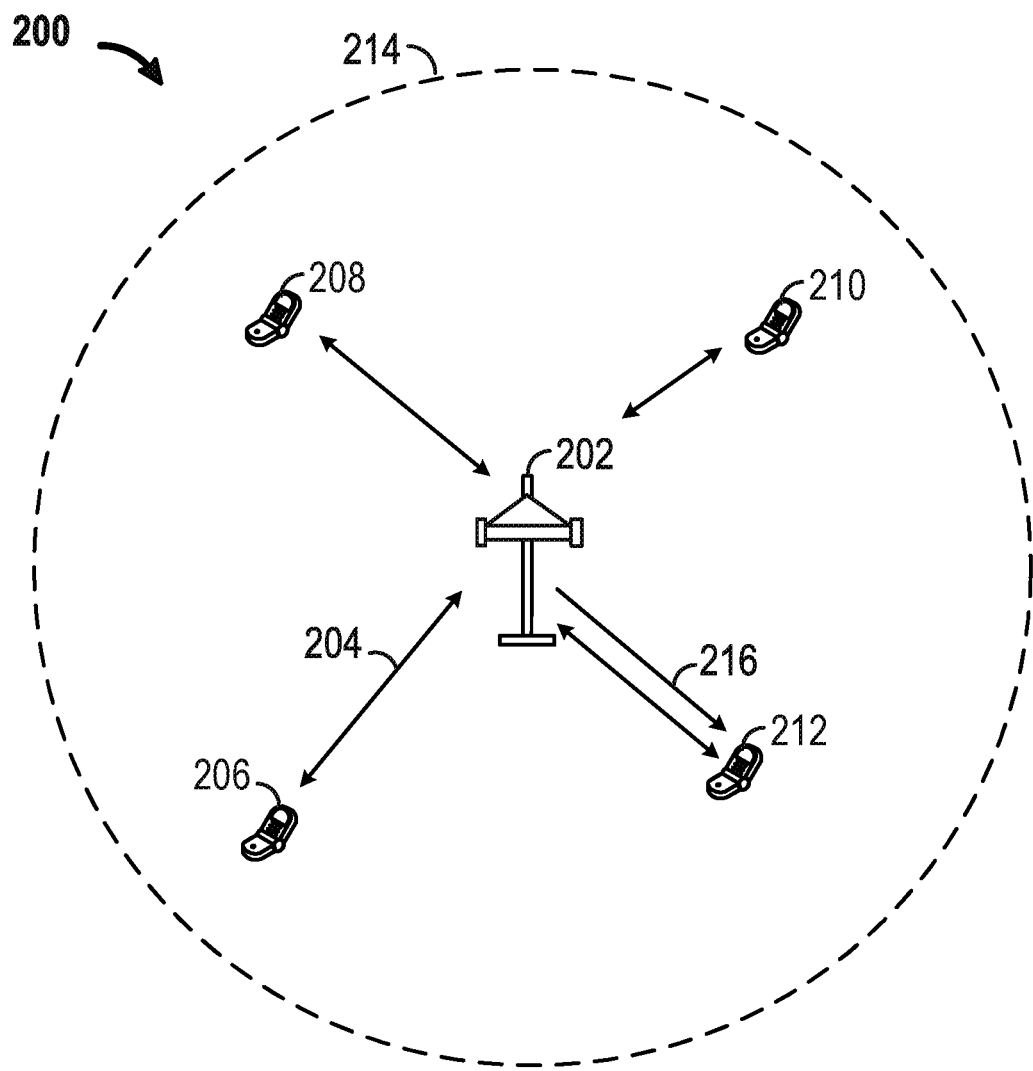
FIG. 2A illustrates a diagram of a wireless network (e.g., a Wi-Fi network).

FIG. 2A is a diagram 200 of a wireless network (e.g., a Wi-Fi network employing the IEEE 802.11 standard). The diagram 200 illustrates an AP 202 broadcasting/transmitting within a service area 214. STAs 206, 208, 210, 212 are within the service area 214 of the AP 202 (although only four STAs are shown in FIG. 2A, more or fewer STAs may be within the service area 214). In uplink (UL) multi-user (MU) MIMO transmissions, each STA 206, 208, 210, 212 may have multiple transmission (Tx) antennas for MIMO. For example, the STA 206 may have 8 Tx antennas, the STA 208 may have 2 Tx antennas, and the STAs 210, 212 may each have 8 Tx antennas.

In addition, the AP 202 may transmit a trigger message 216 to the STA 212 (and to the STAs 206, 208, 210). The trigger message 216 may include configuration information that the STA 212 may use for transmitting a frame to the AP 202. Alternatively, the STA 212 may transmit a frame without receiving a trigger message 216 from the AP 202.

Figure 2B:
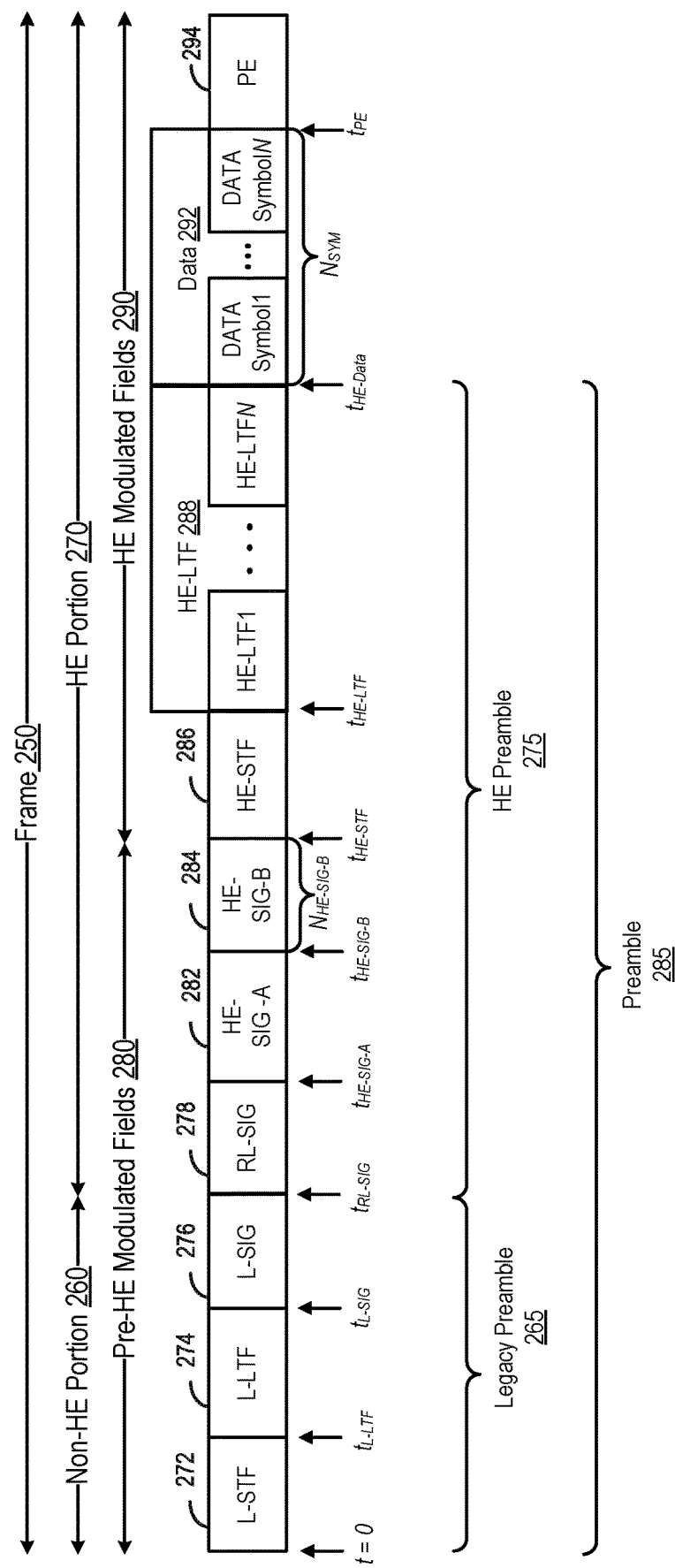
FIG. 2B illustrates a diagram of a frame that may be used in wireless communications of the wireless network illustrated in FIG. 2A.

FIG. 2B is a diagram 201 of a frame 250 that may be transmitted by a STA 212 using different streams and/or antennas. In an aspect, a frame 250 (e.g., physical layer convergence procedure packet data unit (PPDU)) may include a preamble 285 and data field 292 that includes DATA Symbol1-SymbolN. The preamble 285 may be considered a header of the frame 250 with information identifying a modulation and coding scheme, a transmission rate, and a length of time to transmit the frame 250, among other information. For example, the preamble 285 may include a legacy preamble 265 and a high-efficiency (HE) preamble 275. The legacy preamble 265 may contain header information to decode the frame 250. The legacy preamble 265 may include a legacy short training field (STF) (L-STF) symbol 272 that may be transmitted at the start of the frame 250 (e.g., t=0), a legacy long training field (L-LTF) symbol 274 that may be transmitted at time $t_{L-LTF}$ (e.g., the time at which the L-LTF 274 is transmitted with respect to the start of the frame 250), a legacy signal field (L-SIG) symbol 276 transmitted at time $t_{L-SIG}$ (e.g., the time at which the L-SIG 276 is transmitted with respect to the start of the frame 250), and/or other fields. Each of the various fields in the legacy preamble 265 may include one or more OFDM symbols and may have a 1× symbol time duration (e.g., symbol duration of 3.2 μs or a multiple of 3.2 μs). The L-STF symbol 272 may be used to improve automatic gain control (AGC) in a multi-transmit and multi-receive system. AGC controls the gain of a signal. Using AGC means that received weaker signals may be provided additional gain and received stronger signals may be provided less gain or no gain as compared to weaker signals. The L-LTF symbol 274 may be used to provide the information needed for a receiver (e.g., the STA 206 or the AP 202) to perform channel estimation. The L-SIG symbol 276 may be used to provide transfer rate and length information.

In addition to the legacy preamble 265, the preamble 285 may include an HE preamble 275. The HE preamble 275 may include a repeat legacy signal field (RL-SIG) symbol 278 transmitted at time $t_{RL-SIG}$ (e.g., the time at which the RL-SIG 278 is transmitted with respect to the start of the frame 250), an HE signal field A (HE-SIG-A) symbol 242 transmitted at time $t_{HE-SIG-A}$ (e.g., the time at which the HE-SIG-A 242 is transmitted with respect to the start of the frame 250), an $N_{HE-SIG-B}$ number of HE signal field B (HE-SIG-B) symbols 284 transmitted at time $t_{HE-SIG-B}$ (e.g., the time at which the HE-SIG-B 284 is transmitted with respect to the start of the frame 250), an HE short training field (HE-STF) symbol 286 transmitted at time $t_{HE-STF}$ (e.g., the time at which the HE-STF 286 is transmitted with respect to the start of the frame 250), one or more HE long training field (HE-LTF) symbols 288 transmitted at time $t_{HE-LTF}$ (e.g., the time at which the HE-LTF 288 is transmitted with respect to the start of the frame 250), a data field 292 that includes $N_{SYM}$ symbols of data transmitted at time $t_{HE-Data}$ (e.g., the time at which the data field 292 is transmitted with respect to the start of the frame 250), and a packet extension (PE) 294 that includes additional padding is transmitted at time $t_{PE}$ (e.g., the time at which PE 294 is transmitted with respect to the start of the frame 250). In an aspect, the additional padding of the PE 294 may allow for more process time by the receiver, and/or other fields. The HE-STF symbol 286 may be used to improve AGC. The RL-SIG symbol 278 may be a repeated L-SIG symbol 276 and used to improve L-SIG symbol decoding robustness. The HE-SIG-A symbol 282 and/or the HE-SIG-B symbol(s) 284 may be used to provide transfer rate and length information, and the HE-LTF symbols 288 (e.g., HE-LTF1-HE-LTFN) may be used for channel estimation. The number of HE-LTF symbols 288 may be equal to or greater than the number of space-time streams from different STAs. For example, if there are 4 STAs, there may be 4 LTF symbols (i.e., HE-LTF1, HE-LTF2, HE-LTF3, HE-LTF4). The frame 250 may also include a data field 292 that includes a set of data symbols (e.g., DATA Symbol1-SymbolN) that contain the user data to be communicated between the STA 212, for example, and the AP 202. The HE preamble 275 together with the data symbols in the data field 292 and the PE 294 may make up an HE portion 270.

In order to avoid unintentional beamforming, STF signals transmitted on multiple antennas and/or streams may be decoupled at the AP 202 when CSDs are applied by the STA 212. In addition, the AP 202 may be able to properly adjust the AGC setting of the received signals when CSDs are used by the STA 212. Further, CSDs may provide diversity for transmission with a single stream or highly correlated channel (e.g., spatially correlated) with respect to the data field 292. In one aspect, two HE-STF modes may be supported. In a first HE-STF mode, a periodicity of 0.8 μs with five periods (e.g., five STF short symbols) for a non-triggered frame (e.g., a frame that may be transmitted based on a trigger received from the AP 202) may be allowed (e.g., 0.8 μs HE-STF). In a second HE-STF mode, a periodicity of 1.6 μs with five periods (e.g., five STF short symbols) for a trigger based frame (e.g., a frame that may be transmitted based on a trigger received from the AP 202) may be allowed (e.g., 1.6 μs HE-STF).

A change in a channel condition between the different training fields (e.g., L-STF 272, L-LTF 274, L-SIG 276, RL-SIG 278) during a transmission may be known as a beam change. The AP 202 may indicate to the STA 206, 208, 210, 212, or vice versa, whether or not a beam change has occurred during the transmission of the different training fields. In an aspect, the STA 206, 208, 210, 212 may determine whether or not to combine channel estimation results from different training fields (e.g., perform channel estimation enhancement) based on whether or not a beam change has occurred. In one example, the AP 202 may generate multiple fields of the preamble 285 via various steps (e.g., beamforming/precoding over different training fields), and insert a beam change bit (e.g., TX VECTOR parameter BEAM_CHANGE) in a signal field (e.g., RL-SIG 278, HE-SIG-A 282, and/or HE-SIG-B 284) to indicate to the STA 206, 208, 210, 212, or vice versa, if a beam change has occurred.

The AP 202 may then transmit the preamble 285 to the STA 206, 208, 210, 212. The STA 206, 208, 210, 212 may receive the preamble 285, perform channel estimation using the different training fields, and decode the beam change bit (e.g., TX VECTOR parameter BEAM_CHANGE). If the beam change bit is equal to one (e.g., TXVECTOR parameter BEAM_CHANGE=1), then the STA 206, 208, 210, 212 may determine that the channel condition has changed between the different training fields. Alternatively, if the beam change indication bit is equal to zero (e.g., TXVECTOR parameter BEAM_CHANGE=0), then the STA 206, 208, 210, 212 may determine that the channel condition remained the same during the transmission of the different training fields.

In an aspect, when the beam change is equal to zero, the STA 206, 208, 210, 212 may determine to transmit a frame with a CSD determined on a per stream basis where the same frame is copied over to different streams and each of the different streams is transmitted from a group of antennas using one of the CSD values listed below in Table 1. In such a configuration, the applied CSD may be equal to $CSD_s$, where $CSD_s$ is one of the values listed below in Table 1 depending on which stream s is being transmitted. The STA 206, 208, 210, 212 may apply a different per stream $CSD_s$ to each of the different streams. In an aspect, each of the subfields (e.g., 272, 274, 276, 278, 282, 284, 286, 288, 292, 294) in a particular stream s may be transmitted with the same per stream $CSD_s$. In addition, when the beam change is equal to zero, the STA 206, 208, 210, 212 may also determine to transmit the frame with a CSD determined on a per antenna basis. In such a configuration, a particular stream s may be transmitted from an antenna i based on a CSD equal to $CSD_s + CSD_i$. In an aspect of such a configuration, each of the subfields (e.g., 272, 274, 276, 278, 282, 284, 286, 288, 292, 294) in a particular stream s may be transmitted from antenna i based on a CSD equal to $CSD_s + CSD_i$.

Alternatively, when the beam change is equal to one, the STA 206, 208, 210, 212 may determine to transmit the pre-HE modulated fields 280 with a CSD determined per antenna (e.g., see Table 2 infra) and the HE modulated fields 290 with a CSD determined per stream (e.g., see Table 1 infra). When the beam change is equal to one, only one stream may be transmitted for the pre-HE modulated fields 280 and multiple streams may be transmitted for the HE modulated fields 290. When the beam change is equal to one, different per antenna CSDs are applied to the one stream depending on from which antenna the stream is being transmitted for the pre-HE modulated fields 280. As such, each subfield for that one stream is being transmitted with a CSD equal to $CSD_i$ from antenna i, where $CSD_i$ is found below in Table 2. When beam change is equal to one, the STA 206, 208, 210, 212 may determine to transmit the HE modulated fields 290 with a CSD determined on a per stream basis where the same HE modulated fields 290 are copied over to different streams and each of the different streams is transmitted from a group of antennas using one of the CSD values listed below in Table 1. In such a configuration, the applied CSD may be equal to $CSD_s$, where $CSD_s$ is one of the values listed below in Table 1 depending on which stream s is being transmitted. The STA 206, 208, 210, 212 may apply a different per stream $CSD_s$ to each of the different streams for the HE modulated fields 290. In an aspect, each of the subfields (e.g., 286, 288, 292, 294) of the HE modulated fields 290 in a particular stream s may be transmitted with the same per stream $CSD_s$.

In one aspect, a STA 206, 208, 210, 212 may use "spatial expansion" whereby the number of spatial streams that the STA 206, 208, 210, 212 transmits for a given transmission (frame 250) instance to the AP 202 may be less than the number of antennas at the STA 206, 208, 210, 212. Furthermore, the STA 206, 208, 210, 212 may use one spatial expansion matrix (e.g., Q matrix) when transmitting one spatial stream from multiple antennas and another spatial expansion matrix when transmitting two spatial streams from multiple antennas (e.g., more than 2 antennas). Thus, the STA 206, 208, 210, 212 may use a different spatial expansion matrix depending on the number of spatial streams (which may be less than the number of antennas at the STA) for a given transmission. To this end, the STA 206, 208, 210, 212 may store a plurality of spatial expansion matrices and use the appropriate spatial expansion matrix depending on the number of spatial streams sent in a transmission.

Information associated with the spatial expansion matrix may be useful to the AP 202 to sound an extra dimension of the channel when the uplink transmission from the STA 206, 208, 210, 212 does not fully sound the channel. Sounding an extra dimension of the channel may be useful in generating downlink beamforming weights by the AP 202 and also in shifting between different transmit rates for downlink transmissions because knowledge of the spatial expansion provides additional information about the channel and may be indicative of the transmit data rates that the channel will support. In addition, the spatial expansion matrix may be used to improve beamforming performance and rate selection used by the AP 202 for downlink transmissions. Per antenna CSD (e.g., see Table 2 infra) may be applicable to HE modulated fields 290 as part of the spatial expansion matrix.

Figure 2C:
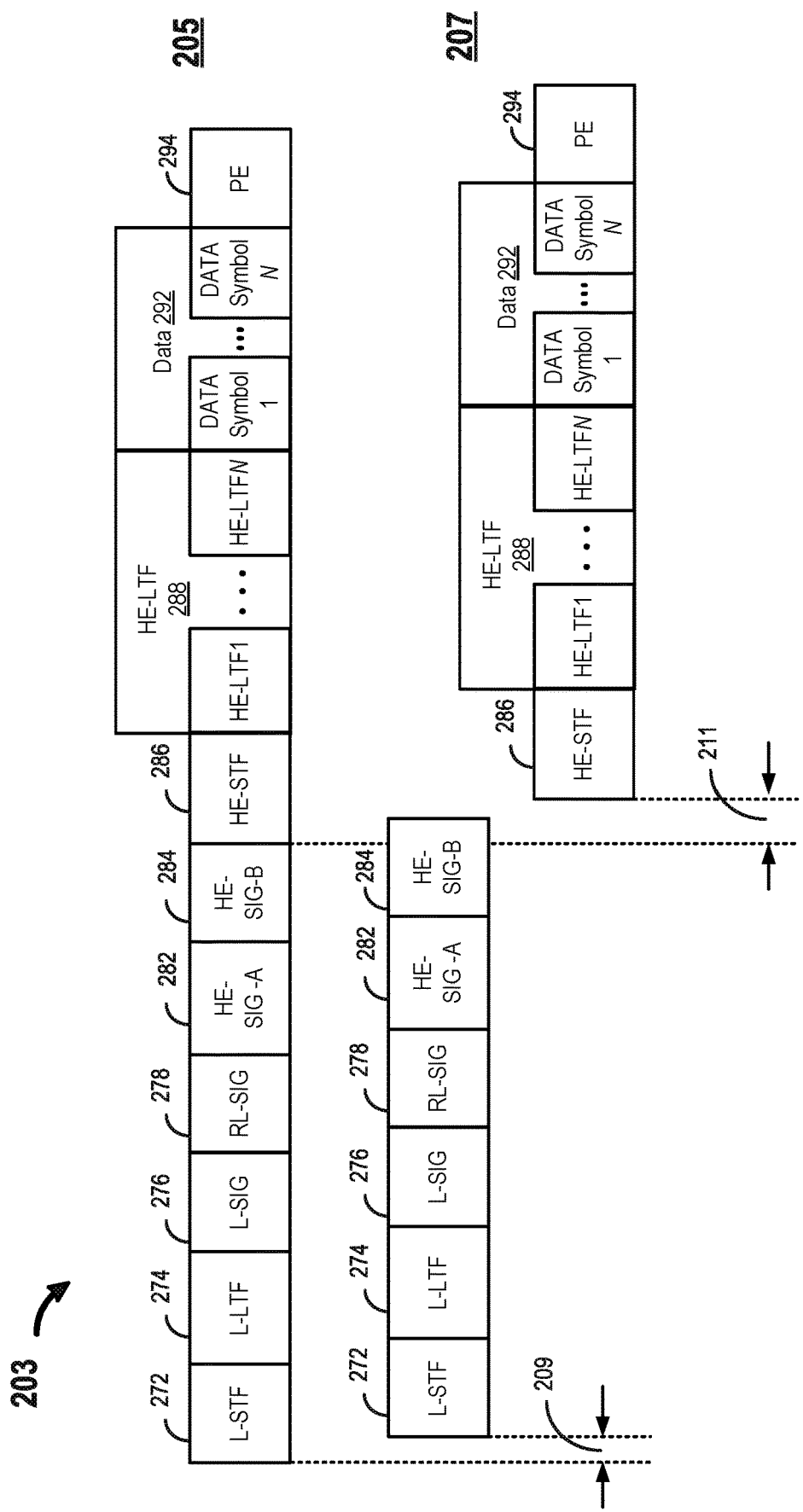
FIG. 2C illustrates a diagram of the frame from FIG. 2B that is transmitted using one or more CSDs.

FIG. 2C is a diagram 203 illustrating a frame 205 without CSD applied and a frame 207 with CSD applied. As shown in FIG. 2C, the pre-HE modulated fields 280 (e.g., fields 272, 274, 276, 278, 282, 284) have CSD 209 applied and the HE modulated fields 290 (e.g., fields 286, 288, 292, 294) have CSD 211 applied.

For example, when the beam change is equal to zero, the STA 206, 208, 210, 212 may apply a per stream CSD 209, 211 (e.g., see Table 1 infra) to pre-HE modulated fields 280 (e.g., fields 272, 274, 276, 278, 282, 284) and to the HE modulated fields 290 (e.g., fields 286, 288, 292, 294). In such a configuration, the per stream CSDs 209, 211 may be equal. Optionally, when the beam change is equal to zero, a per antenna CSD (e.g., see Table 2 infra) may additionally be applied to the pre-HE modulated fields 280 and the HE modulated fields 290.

Alternatively, when the beam change is equal to one, the STA 206, 208, 210, 212 may apply a per antenna CSD 209 (e.g., see Table 2 infra) to pre-HE modulated fields 280 (e.g., fields 272, 274, 276, 278, 282, 284) and a per stream CSD 211 (e.g., see Table 1 infra) to the HE modulated fields 290 (e.g., fields 286, 288, 292, 294). In such a configuration, the CSDs 209 and 211 may be different.

As further discussed below, the present disclosure may provide a way to determine which CSD values to use in per antenna and per stream scenarios to avoid unintentional beamforming. The CSD values may be utilized for transmission by a STA 206, 208, 210, 212 in the non-trigger frame mode (e.g., transmitting a frame not triggered by an AP 202) and the trigger frame mode (e.g., transmitting a frame triggered by an AP 202). The CSD values may be applied to the HE modulated fields 290 and/or the pre-HE modulated fields 280. In addition, how a STA may apply a CSD in an UL MU MIMO transmission is described infra.

Figure 3:
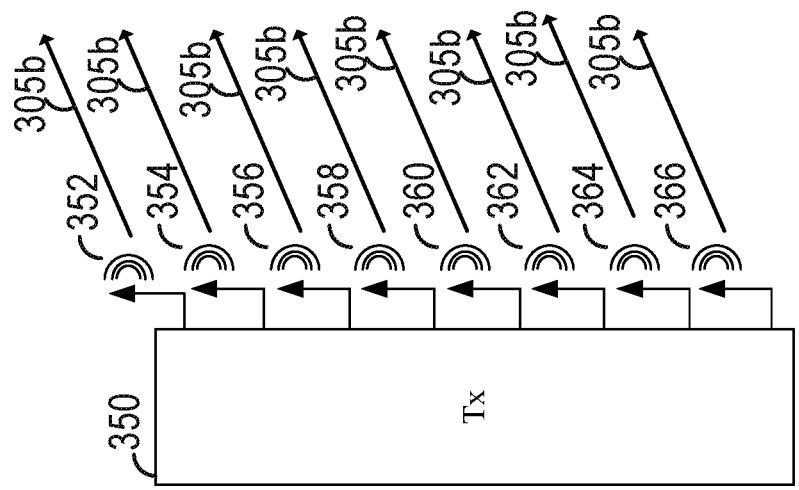
FIG. 3 illustrates diagrams of stations that may be configured to determine per antenna and/or per stream CSD values for transmitting information.
Figure 3:
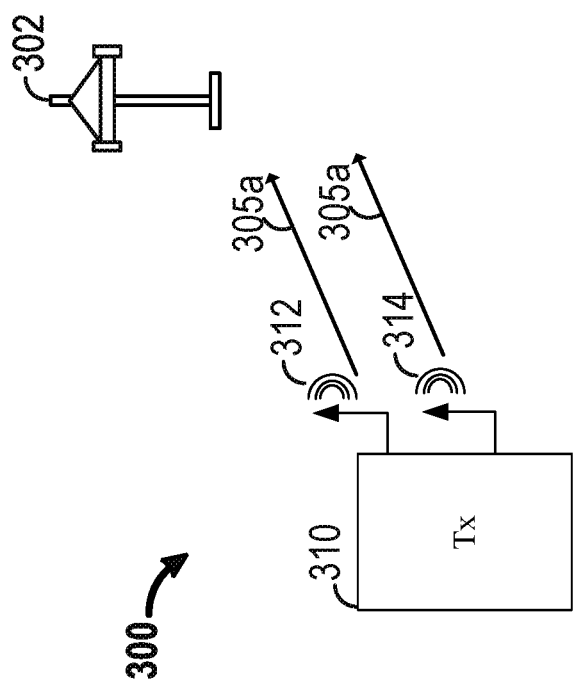

FIG. 3 is a diagram 300 of STAs 310, 350 that may determine per antenna and/or per stream CSD values for transmitting information (e.g., the pre-HE modulated fields 280 and the HE modulated fields 290). Diagram 300 illustrates 2 STAs 310 and 350 (which may correspond to STAs 208, 206) associated with and/or served by an AP 302. In one aspect, STA 310 may have 2 antennas. For example, STA 310 includes antennas 312, 314. In another aspect, STA 350 may have 8 antennas. For example, STA 350 includes antennas 352, 354, 356, 358, 360, 362, 364, 366.

During uplink transmissions, for example, the antennas for the STA 310 may transmit information 305a to an AP 302 and the antennas for the STA 350 may also be transmitting information 305b to the AP 302. For example, information 305a, 305b may include the pre-HE modulated fields 280 and/or the HE modulated fields 290 in frame 250. To avoid unintentional beamforming, CSD may be used to transmit a first set of information associated with the pre-HE modulated fields 280 and a second set of information associated with the HE modulated fields 290 (e.g., based on whether a beam change is equal to zero or one).

Different CSD options may apply to the pre-HE modulated fields 280 as compared to the CSD options applied to the HE modulated fields 290 because cyclic shifts for pre-HE modulated fields 280 may be limited to a maximum of 200 ns, while the cyclic shifts for HE modulated fields 290 may have a maximum of 400 ns. As such, the discussion below presents per stream CSD options and per antenna CSD options for the pre-HE modulated fields 280 and CSD options for HE modulated fields 290 based on whether a beam change is equal to zero or one.

HE Modulated Fields

The per stream CSD values discussed below may apply to HE-STF 286, HE-LTF 288, and data field 292 of the HE modulated fields 290 when the TXVECTOR parameter BEAM_CHANGE is 1, and apply to the entire frame 250 (e.g., pre-HE modulated fields 280 and HE modulated fields 290) when the TXVECTOR parameter BEAM_CHANGE is 0.

Throughout the HE modulated fields 290 (e.g., very high throughput (VHT) fields) of the preamble 285, CSDs may be applied to prevent unintentional beamforming when correlated signals are transmitted in multiple space-time streams. In an aspect, the same CSD may also be applied to the multiple space-time streams during the transmission of the data field 292 in the HE modulated fields 290. For the r-th Richardson-Urbanke (RU) encoding process, the CSD values $T_{CS,HE}(n)$ for the HE modulated fields 290 for space-time stream n out of $N_{STS,r,total}$ total space-time streams is shown below in Table 1.

TABLE 1

$T_{CS,VHT(n)}$ values for the VHT modulated fields of a PPDU

| Total number of space-time streams ($N_{STS,total}$) | Cyclic shift for space-time stream n (in units of ns) | | | | | | | |
|---|---|---|---|---|---|---|---|---|
| | 1 | 2 | 3 | 4 | 5 | 6 | 7 | 8 |
| 1 | 0 | — | — | — | — | — | — | — |
| 2 | 0 | −400 | — | — | — | — | — | — |
| 3 | 0 | −400 | −200 | — | — | — | — | — |
| 4 | 0 | −400 | −200 | −600 | — | — | — | — |
| 5 | 0 | −400 | −200 | −600 | −350 | — | — | — |
| 6 | 0 | −400 | −200 | −600 | −350 | −650 | — | — |
| 7 | 0 | −400 | −200 | −600 | −350 | −650 | −100 | — |
| 8 | 0 | −400 | −200 | −600 | −350 | −650 | −100 | −750 |

Cyclic shift values for the VHT modulated fields of a PPDU

From the AGC performance point of view, the maximum CSD value may be limited by STF periodicity, the larger the CSD, the better the STF performance, and scaling CSD with the same down-clocking factor as STF periodicity leads to acceptable STF performance (e.g., 2 MHz and up). With respect to HE modulated fields 290, the STA 310, 350 may use one per stream CSD option for transmitting a non-trigger based frame and another per stream CSD option for transmitting a trigger based frame.

Non-Trigger Based Frame

HE modulated fields 290 (e.g., which may include the HE-STF symbol 286, the HE-LTF symbol(s) 288, the data field 292, and the PE 294) may be transmitted in spatial streams with a per stream CSD when the frame 250 is a non-trigger based frame (e.g., STF periodicity of 0.8 μs). and when the beam change is equal to zero. In an aspect, the frame 250 may be coped over into multiple spatial streams and each of the spatial streams may be transmitted with a different per stream CSD value (e.g., the different CSD values seen in Table 1 supra).

For example, when a STA determines that a beam change is equal to zero and that there is a frame to be transmitted that is not based on a trigger, the STA determines to transmit the frame (e.g., pre-HE modulated fields 280 and HE modulated fields 290) with CSDs determined based on a per stream basis. When the STA transmits a frame with a particular per stream CSD, each subfield (e.g., fields 272, 274, 276, 278, 282, 284, 286, 288, 292, 294) in the frame is transmitted with that particular per stream CSD. The STA determines how many additional n streams may be used to transmit the same frame (e.g., the same information). Assume n is equal to 7 such that the STA determines to transmit the frame in eight different streams—stream A (e.g., stream 1 in Table 1 supra), stream B (e.g., stream 2 in Table 1 supra), stream C (e.g., stream 3 in Table 1 supra), stream D (e.g., stream 4 in Table 1 supra), stream E (e.g., stream 5 in Table 1 supra), stream F (e.g., stream 6 in Table 1 supra), stream G (e.g., stream 7 in Table 1 supra), and stream H (e.g., stream 8 in Table 1 supra).

For example, the STA may apply a 0 ns CSD value to stream A, a −400 ns CSD value to stream B, a −200 ns CSD value to stream C, a −600 ns CSD to stream D, a −350 ns CSD value to stream E, a −650 ns CSD to stream F, a −100 ns CSD value to stream G, and −750 ns CSD value to stream H, as seen above in Table 1. Accordingly, stream A may be transmitted at time 0, stream B may be transmitted with a 400 ns cyclic delay compared to stream A, stream C may be transmitted with a 200 ns cyclic delay compared to stream A, stream D may be transmitted with a 600 ns cyclic delay compared to stream A, stream E may be transmitted with a 350 cyclic delay compared to stream A, stream F may be transmitted with a 650 cyclic delay compared to stream A, stream G may be transmitted with a 100 ns cyclic delay compared to stream A, and stream H may be transmitted with a 750 cyclic delay compared to stream A. In an aspect, the STA 350 may assign other CSD values to each of the streams based on the STF periodicity.

Trigger Based Frame

Option 1

In addition, the frame 250 may be transmitted in spatial streams with a per stream CSD when the STA determines that the beam change is equal to zero and receives a trigger message from the AP. When the STA transmits a trigger based frame with a particular per stream CSD, each subfield (e.g., fields 272, 274, 276, 278, 282, 284, 286, 288, 292, 294) in the frame is transmitted with that particular per stream CSD. The STA determines how many additional n streams may be used to transmit the same frame (e.g., the same information). Assume n is equal to 7 such that the STA determines to transmit the frame in eight different streams— stream A (e.g., stream 1 in Table 1 supra), stream B (e.g., stream 2 in Table 1 supra), stream C (e.g., stream 3 in Table 1 supra), stream D (e.g., stream 4 in Table 1 supra), stream E (e.g., stream 5 in Table 1 supra), stream F (e.g., stream 6 in Table 1 supra), stream G (e.g., stream 7 in Table 1 supra), and stream H (e.g., stream 8 in Table 1 supra).

Assuming the trigger based frame has double the STF periodicity (e.g., 1.6 μs HE-STF) as compared to a non-trigger based frame (e.g., 0.8 μs HE-STF), the per stream CSD values (e.g., listed above in Table 1 supra) for the trigger based frame may be doubled. For example, the STA may apply a 0 ns CSD value to stream A, a −800 ns CSD value to stream B, a −400 ns CSD value to stream C, a −1200 ns CSD value to stream D, a −700 ns CSD value to stream E, a −1300 ns CSD value to stream F, a −200 ns CSD value to stream G, and −1500 ns stream value to stream H. Accordingly, stream A may be transmitted at time 0, stream B may be transmitted with a 800 ns cyclic delay compared to stream A, stream C may be transmitted with a 400 ns cyclic delay compared to stream A, stream D may be transmitted with a 1200 ns cyclic delay compared to stream A, stream E may be transmitted with a 700 cyclic delay compared to stream A, stream F may be transmitted with a 1300 cyclic delay compared to stream A, stream G may be transmitted with a 200 ns cyclic delay compared to stream A, and stream H may be transmitted with a 1500 cyclic delay compared to stream A.

Option 2

In a second option, for a trigger based frame when the beam change is equal to zero, the per stream CSD values shown above in Table 1 may be reused as the per stream CSD values. For example, the STA 350 may determine a per stream CSD value for each of stream A (e.g., stream 1 in Table 1 supra), stream B (e.g., stream 2 in Table 1 supra), stream C (e.g., stream 3 in Table 1 supra), stream D (e.g., stream 4 in Table 1 supra), stream E (e.g., stream 5 in Table 1 supra), stream F (e.g., stream 6 in Table 1 supra), stream G (e.g., stream 7 in Table 1 supra), and stream H (e.g., stream 8 in Table 1 supra).

For example, stream A may be given a 0 ns CSD value, stream B may be given a −400 ns CSD value, stream C may be given a −200 ns CSD value, stream D may be given a −600 ns CSD value, stream E may be given a −350 ns CSD value, stream F may be given a −650 ns CSD value, stream G may be give a −100 ns value, and stream H may be given a −750 ns stream value. Accordingly, stream A may be transmitted at time 0, stream B may be transmitted with a 400 ns cyclic delay compared to stream A, stream C may be transmitted with a 200 ns cyclic delay compared to stream A, stream D may be transmitted with a 600 ns cyclic delay compared to stream A, stream E may be transmitted with a 350 cyclic delay compared to stream A, stream F may be transmitted with a 650 cyclic delay compared to stream A, stream G may be transmitted with a 100 ns cyclic delay compared to stream A, and stream H may be transmitted with a 750 cyclic delay compared to stream A.

Option 3

In a third option, to reduce the mathematical complexity of implementing a frequency domain application of CSD, the per stream CSD values for the eight streams discussed above with respect to Option 1 may be rounded down (e.g., by a percentage) before being applied to each stream. For example, each of the CSD values may be rounded down to 1.6 µs/8 such that stream A may be given a 0 ns CSD value, stream B may be given a −800 ns CSD value, stream C may be given a −400 ns CSD value, stream D may be given a −1000 ns CSD value, stream E may be given a −600 ns CSD value, stream F may be given a −1200 ns CSD value, stream G may be give a −200 ns value, and stream H may be given a −1400 ns stream value.

Although eight streams are discussed above with respect to Option 1, Option 2, and Option 3, the CSD values may be applied to fewer or more than eight streams.

Pre-HE Modulated Fields

Beam Change Equal to 1

When the beam change is equal to one, the pre-HE modulated fields 280 may be modulated the same way as the legacy preamble 265. For example, the pre-HE modulated fields 280 may be modulated using omni-transmission along with per antenna CSD, where the maximum CSD value may be less than or equal to 200 ns. In addition, when the beam change is equal to one, the HE modulated fields 290 may be transmitted using the per stream CSD values seen above in Table 1.

In an aspect, when the TXVECTOR parameter BEAM_CHANGE is 1, the per antenna CSD value $T_{CS}^{iTX}$ for the L-STF 272, L-LTF 274, L-SIG 276, RL-SIG 278, and HE-SIG-A 282 fields of frame 250 (e.g., for transmit chain $i_{TX}$ out of a total of $N_{TX}$ number of antennas in the transmit chain) may be defined by the values listed below in Table 2. In UL MU transmissions, the per antenna CSD value $T_{CS}^{iTX}$ may be based on a transmit chain index (e.g., the order in which the STAs 206, 208, 210, 212 transmit) of each STAs.

TABLE 2 values for L-STF, L-LTF, L-SIG, and VHT-SIG-A fields of the PPDU

| Total number of transmit chains ($N_{TX}$) per frequency segment | Cyclic shift for transmit chain $i_{TX}$ (in units of ns) | | | | | | | | |
|---|---|---|---|---|---|---|---|---|---|
| | 1 | 2 | 3 | 4 | 5 | 6 | 7 | 8 | >8 |
| 1 | 0 | — | — | — | — | — | — | — | — |
| 2 | 0 | −200 | — | — | — | — | — | — | — |
| 3 | 0 | −100 | −200 | — | — | — | — | — | — |
| 4 | 0 | −50 | −100 | −150 | — | — | — | — | — |
| 5 | 0 | −175 | −25 | −50 | −75 | — | — | — | — |
| 6 | 0 | −200 | −25 | −150 | −175 | −125 | — | — | — |
| 7 | 0 | −200 | −150 | −25 | −175 | −75 | −50 | — | — |
| 8 | 0 | −175 | −150 | −125 | −25 | −100 | −50 | −200 | — |
| >8 | 0 | −175 | −150 | −125 | −25 | −100 | −50 | −200 | Between −200 and 0 inclusive |

Cyclic shift values for L-STF, L-LTF, L-SIG, and VHT-SIG-A fields of the PPDU

Beam Change Equal to 0

Per Stream CSD

When the beam change is equal to zero, the pre-HE modulated fields 280 may be modulated in a same or similar manner as HE-LTF symbol 288 (e.g., HE-LTF1) and may be applicable to a SU non-trigger based frame scenario (e.g., 0.8 µs HE-STF). In an SU non-trigger based frame scenario, CSD values may be applied for up to two streams. Referring to diagram 300, the STA 310 may determine and/or identify two spatial streams—stream A and stream B—for transmitting the first set of information associated with the pre-HE modulated fields 280.

For example, stream A may be given a 0 ns CSD value and stream B may be given a −400 ns CSD value. Accordingly, stream A may be transmitted at time 0 and stream B may be transmitted with a 400 ns cyclic delay compared to stream A.

Per Antenna CSD

Optionally, when the beam change is equal to zero, the pre-HE modulated fields 280 and/or the HE modulated fields 290 may also be modulated using a per antenna CSD. The per antenna CSD may be limited to a maximum CSD that may be up to implementation at the STA (e.g., see Options 1, 2, and 3 infra). By setting a maximum CSD, the maximum phase shift between adjacent tones may be limited to accommodate timing estimation by the AP. However, when the TXVECTOR parameter BEAM_CHANGE is 0, the per antenna CSD value $T_{CS}^{iTX}$ for the L-STF 272, L-LTF 274, L-SIG 276, RL-SIG 278, and HE-SIG-A 282 fields may not be specified.

Option 1

In a first option, the limitation with respect to the maximum CSD applied may be that no per antenna CSD is applied in certain instances. For example, with per stream CSD, the L-STF 274 power may be turned off from data when one stream is being used with multiple Tx antennas.

Option 2

In a second option, the per antenna CSD that may be applied may be less than or equal to a maximum CSD value of 200 ns.

Option 3

In a third option, any per antenna CSD value may be applied as long as the maximum CSD value is less than or equal to 400 ns. For example, when there are two streams, a 400 ns delay may already present in per stream CSD. The 400 ns delay may be two times the legacy CSD per antenna CSD (e.g., 200 ns delay in legacy per antenna CSD). In the third option, the same per antenna CSD value may be applied to the HE modulated fields 290 as well.

CSD Application in UL MU MIMO

Per Antenna CSD

In a first UL MU MIMO scenario, per antenna CSD may be applied for each participating STA 206, 208, 210, 212. In an aspect, the number of Tx antennas may be unknown to other STAs in an UL MU transmission. The local per antenna CSD (e.g., at each participating STA 206, 208, 210, 212) may be adequate for the AP 202 to differentiate between transmissions from different STAs 206, 208, 210, 212 due to different inter-arrival times/powers at the AP 202. The CSD value applied to the pre-HE modulated fields 280 may include the per antenna CSD values seen above in Table 2. The per antenna CSD applied to the HE modulated fields 290 may be up to implementation.

In a second UL MU MIMO scenario, per antenna CSD in the pre-HE modulated field 280 of UL MU MIMO transmission may be a function of a Tx antenna index of each participating STA 206, 208, 210, 212. In an aspect, per antenna CSD may be applied in the same way as an SU transmission (e.g., the STA 206, 208, 210, 212 uses a local antenna index to decide which CSD value from the table is applicable to which Tx antenna).

Per Stream CSD

In an aspect, a global CSD index may be based on the stream allocation to each STA (e.g., located in the trigger message 216 received from the AP 202) in an UL MU MIMO scenario. For example, if one of the STAs 206, 208, 210, 212 is assigned streams three and four for transmission, then the corresponding per stream CSDs are the third and fourth values in the global index. In a third UL MU MIMO scenario, a global per stream CSD may be applied to each participating STA 206, 208, 210, 212. When the frame 250 is a trigger based frame, each STA 206, 208, 210, 212 may use a global CSD index to determine which CSD value may be applied to which stream.

Special Consideration for CSD on OFDMA Data

A large per antenna CSD value (e.g., greater than 400 ns) may be needed for OFDMA data, a single stream transmission, and/or a highly correlated channel. In an aspect, a longer symbol duration may be able to tolerate a larger CSD value. However, a smaller resource unit size may lead to insufficient averaging within one resource unit to be able to de-couple the channels at the AP 202. For example, when there are two Tx antennas at the STA 206, 208, 210, 212 and one receiver antenna at the AP 202, channels from the two Tx antennas may be separated by 400 ns (e.g., 400 ns=8*50 ns) if per antenna CSD values of [0 −400] that correspond to a 2.5 MHz period (e.g., 20 MHz/8=2.5 MHz) are applied. However, a 26-tone resource unit may have only about a 2 MHz bandwidth. Over such a narrow bandwidth, full CSD diversity may not be captured by the AP 202. In a multiple stream transmission, the spatial expansion matrix may be enough to orthogonalize the data. The present disclosure proposes two options to solve the potential issues associated with CSD on OFDMA data.

Option 1

The per antenna CSD values may be increased to provide sufficient diversity to be captured by the AP 202. For example, the CSD values may be increased by a factor of four to obtain new CSD values (e.g., CSD_new). The new CSD values may be equal to four multiplied by the CSD values plus a vector offset (e.g., CSD_new=4*CSD_11ac+ $\Delta_{1\times8}$). The new CSD values may be applied to both HE-STF symbol 286 and the data symbols in the data field 292, as well as other symbols and fields. The CSD values may be, for example, [0 −400 −200 −600 −350 −650 100 −750] ns (e.g., as seen above in Table 1). The vector offset $\Delta_{1\times8}$ may be necessary to prevent degrading STF performance. The effective CSD applied to the STF (e.g., CSD_STF) may be different for a trigger based frame and a non-trigger based frame (e.g., CSD_STF=mod(CSD_new, STF_period)). For example, the STF_period may be equal to 0.8 μs for a non-trigger based frame or 1.6 μs for a trigger based frame.

By way of example, if the vector offset $\Delta_{1\times8}$ is equal to [0 −400 −200 −600 +250 450 +300 −150], then CSD_new is equal to [0 −2000 −1000 −3000 −1150 −3050 −100 −3150] ns. Thus, for a non-trigger based frame with a periodicity of 0.8 μs the CSD_STF is equal to [0 −400 −200 −600 −350 −650 −100 −750 ns] (e.g., which is equal to the CSD values seen in Table 1). However, for a trigger based frame with a periodicity of 1.6 μs the CSD_STF is equal to [0 −400 −1000 −1400 −1150 −1450 −100 −1550] ns.

Option 2

Alternatively, the per antenna CSD values may be applied randomly for each transmission from the STAs 206, 208, 210, 212 to the AP 202. Any correlation issues in which the AP 202 is unable to assign a transmission to a particular STA 206, 208, 210, 212 may be resolved by retransmissions by the STAs 206, 208, 210, 212. Alternatively, the STAs 206, 208, 210, 212 may change the spatial expansion matrix in a retransmission. In an aspect, the spatial expansion matrix may be determined based on implementation and may include extra CSD values per transmission chain.

Figure 4:
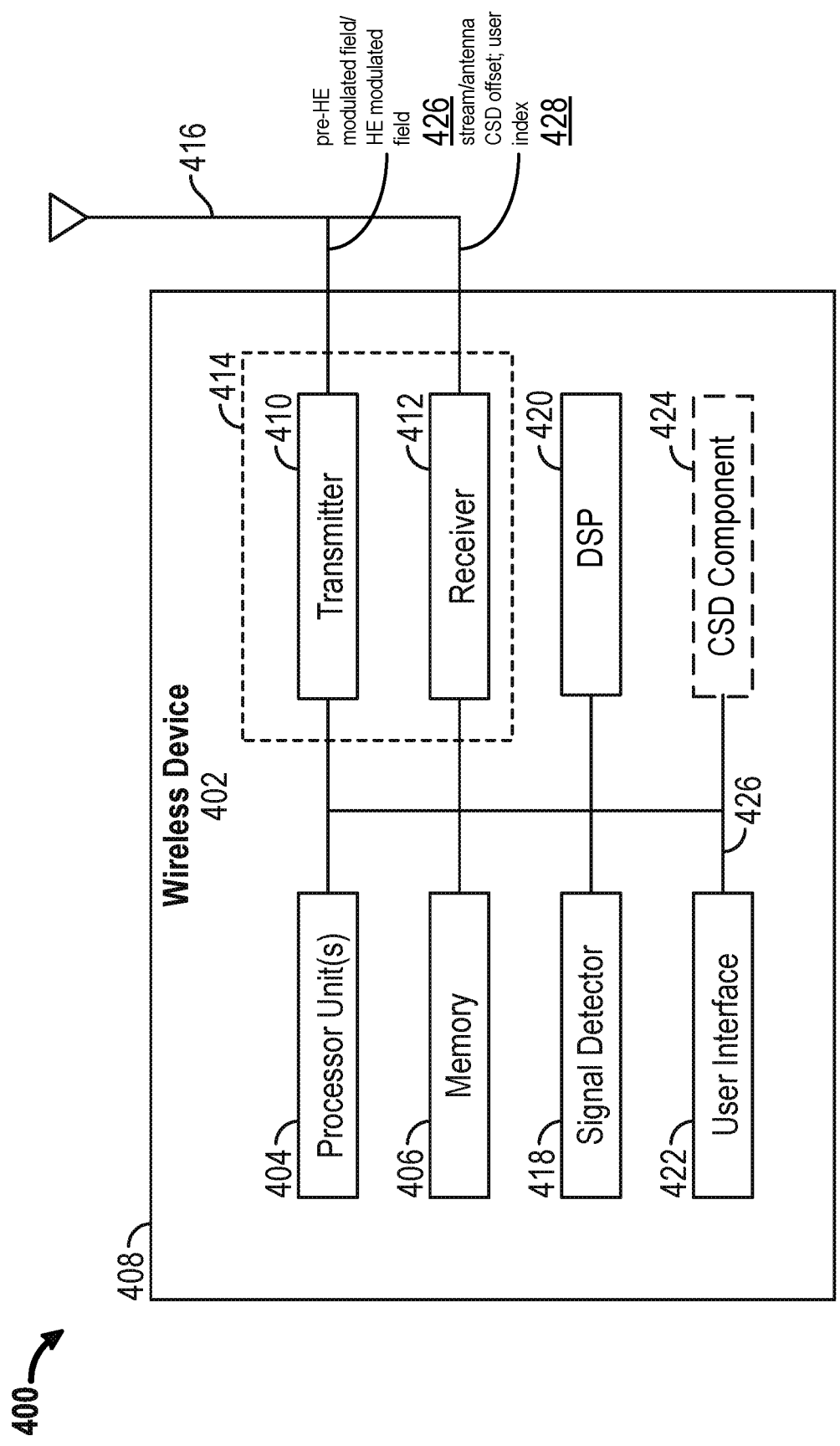
FIG. 4 is a functional block diagram of a wireless device that may be employed within the wireless communication system of FIG. 1 for transmitting information using per antenna and/or per stream CSD values.

FIG. 4 is a functional block diagram 400 of a wireless device 402 that may be employed within the wireless communication system 100 of FIG. 1 for transmitting information using per antenna and/or per stream CSD values. The wireless device 402 is an example of a device that may be configured to implement the various methods described herein. For example, the wireless device 402 may be the STAs 112, 114, 116, 118.

The wireless device 402 may include a processor 404 which controls operation of the wireless device 402. The processor 404 may also be referred to as a central processing unit (CPU). Memory 406, which may include both read-only memory (ROM) and random access memory (RAM), may provide instructions and data to the processor 404. A portion of the memory 406 may also include non-volatile random access memory (NVRAM). The processor 404 typically performs logical and arithmetic operations based on program instructions stored within the memory 406. The instructions in the memory 406 may be executable (by the processor 404, for example) to implement the methods described herein.

The processor 404 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 402 may also include a housing 408, and the wireless device 402 may include a transmitter 410 and/or a receiver 412 to allow transmission (e.g., pre-HE modulated field/HE modulated field 426) and reception (per stream/per antenna CSD offset/user index 428) of data transmissions between the wireless device 402 and a remote device. The transmitter 410 and the receiver 412 may be combined into a transceiver 414. An antenna 416 may be attached to the housing 408 and electrically coupled to the transceiver 414. The wireless device 402 may also include multiple transmitters, multiple receivers, multiple transceivers, and/or multiple antennas.

The wireless device 402 may also include a signal detector 418 that may be used to detect and quantify the level of signals received by the transceiver 414 or the receiver 412. The signal detector 418 may detect such signals as total energy, energy per subcarrier per symbol, power spectral density, and other signals. The wireless device 402 may also include a digital signal processor (DSP) 420 for use in processing signals. The DSP 420 may be configured to generate a packet for transmission. In some aspects, the packet may comprise a PPDU.

The wireless device 402 may further comprise a user interface 422 in some aspects. The user interface 422 may comprise a keypad, a microphone, a speaker, and/or a display. The user interface 422 may include any element or component that conveys information to a user of the wireless device 402 and/or receives input from the user.

When the wireless device 402 is implemented as a STA (e.g., the STA 114, the STA 206), the wireless device 402 may also comprise a CSD component 424 that may determine per stream and/or per antenna CSD values to apply to a frame that will be transmitted to an AP. In one configuration, the wireless device 402 may include means for determining whether to transmit a frame with CSDs based on a number of antennas at the station for transmitting the frame, a number of streams used to transmit the frame by the station, or both the number of antennas at the station for transmitting the frame and the number of streams used to transmit the frame by the station. In another configuration, the wireless device 402 may include means for determining a first set of CSD values for transmitting a first set of information associated with a first portion of the frame based on whether it is determined to transmit the frame with the CSDs based on the number of antennas at the station for transmitting the frame, the number of streams used to transmit the frame by the station, or both the number of antennas at the station for transmitting the frame and the number of streams used to transmit the frame by the station. In an aspect, the first portion of the frame may include a pre-HE modulated field. In a further configuration, the wireless device 402 may include means for determining a second set of CSD values for transmitting a second set of information associated with a second portion of the frame based on whether it is determined to transmit the frame with the CSDs based on the number of antennas at the station for transmitting the frame, the number of streams used to transmit the frame by the station, or both the number of antennas at the station for transmitting the frame and the number of streams used to transmit the frame by the station. In an aspect, the second portion of the frame is an HE modulated field or a data field. In one configuration, the wireless device 402 may include means for determining if a beam change is equal to zero or one. In another configuration, the wireless device 402 may include means for determining a stream CSD value for each stream in the number of streams when the beam change is equal to zero. In an aspect, the stream CSD value for each stream may be the first set of CSD values and the second set of CSD values. In a further configuration, the wireless device 402 may include means for applying the stream CSD value for each stream to the first portion of the frame and the second portion of the frame. In one configuration, the wireless device 402 may include means for determining an antenna CSD value for each antenna in the number of antennas. In another configuration, the wireless device 402 may include means for determining an antenna CSD value for each antenna in the number of antennas and a stream CSD value for each antenna in the number of antennas when the beam change is equal to one. In an aspect, the antenna CSD value for each antenna may be the first set of CSD values and the stream CSD value for each stream may be the second set of CSD values. In a further configuration, the wireless device 402 may include means for applying the antenna CSD value for each antenna to the first portion of the frame and the stream CSD value for each antenna to the second portion of the frame. In one configuration, the wireless device 402 may include means for determining whether the frame is a trigger-based frame or a non-trigger based frame. In another configuration, the wireless device 402 may include means for multiplying the stream CSD value for each stream by an integer greater than one to obtain the first set of CSD values when it is determined that the frame is trigger based. In a further configuration, the wireless device 402 may include means for reducing each value in the first set of CSD values by a percentage after multiplying. In one configuration, the wireless device 402 may include means for determining a vector CSD offset. In another configuration, the wireless device 402 may include means for modifying the antenna CSD value for each antenna based on the determined vector CSD offset to obtain the second set of CSD values. In an aspect, each per antenna CSD value may be randomly applied. In one configuration, the wireless device 402 may include means for changing a spatial expansion matrix associated with a retransmission of the first set of information. In another configuration, the wireless device 402 may include means for receiving a trigger from a base station. In an aspect, the trigger may include an index based on a number of streams or a number of antennas allocated in an uplink multi-user multiple-input multiple-output scenario. In another aspect, the index may be one of a global index or a local index. In a further aspect, the first set of CSD values may be determined based on the index.

The various components of the wireless device 402 may be coupled together by a bus system 426. The bus system 426 may include a data bus, for example, as well as a power bus, a control signal bus, and a status signal bus in addition to the data bus. Components of the wireless device 402 may be coupled together or accept or provide inputs to each other using some other mechanism.

Although a number of separate components are illustrated in FIG. 4, one or more of the components may be combined or commonly implemented. For example, the processor 404 may be used to implement not only the functionality described above with respect to the processor 404, but also to implement the functionality described above with respect to the signal detector 418, the DSP 420, the user interface 422, and/or the CSD component 424. Further, each of the components illustrated in FIG. 4 may be implemented using a plurality of separate elements.

Figure 5A:
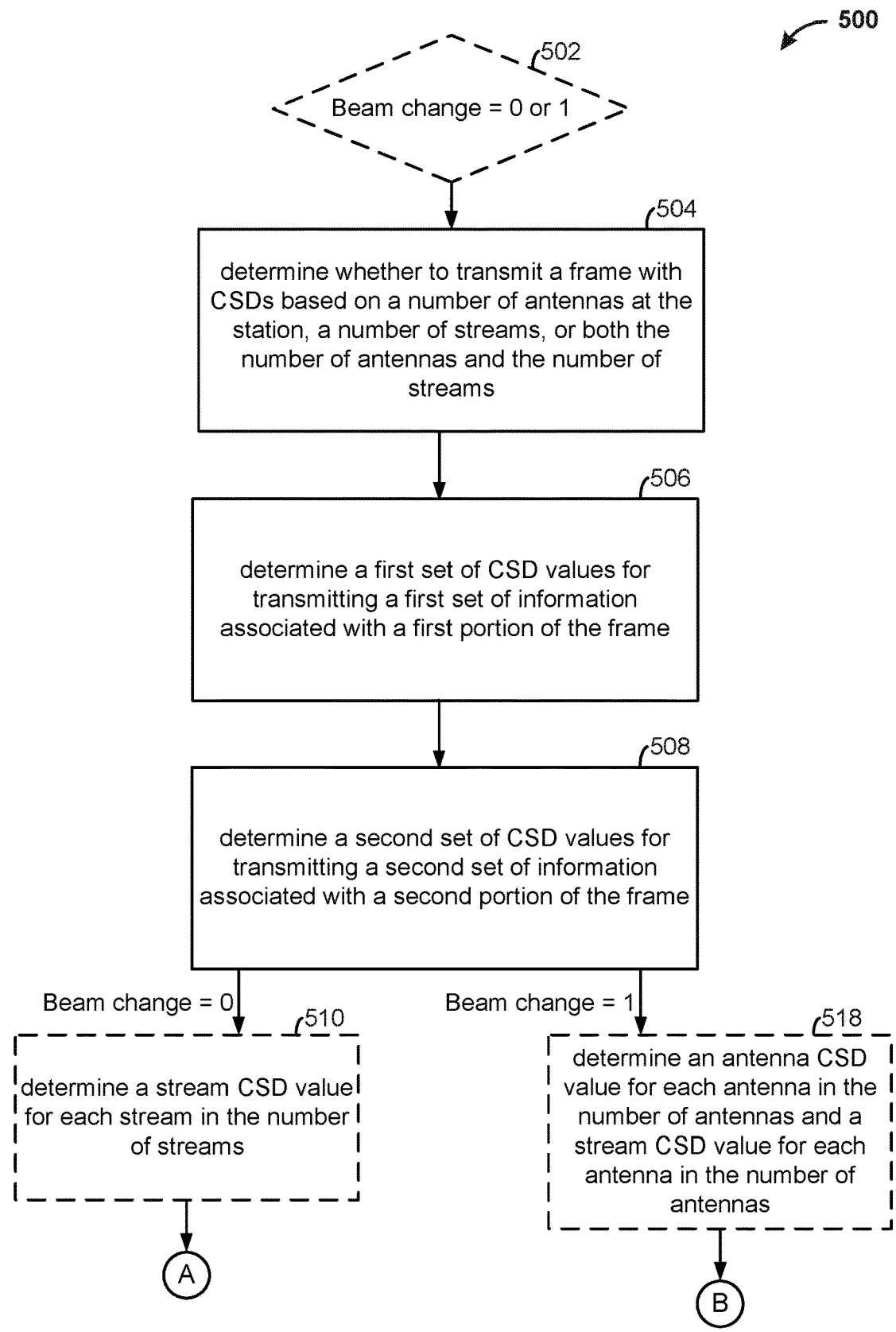
FIGS. 5A-5C are a flowchart of an exemplary method of wireless communication for transmitting information using per antenna and/or per stream CSD values.
Figure 5B:
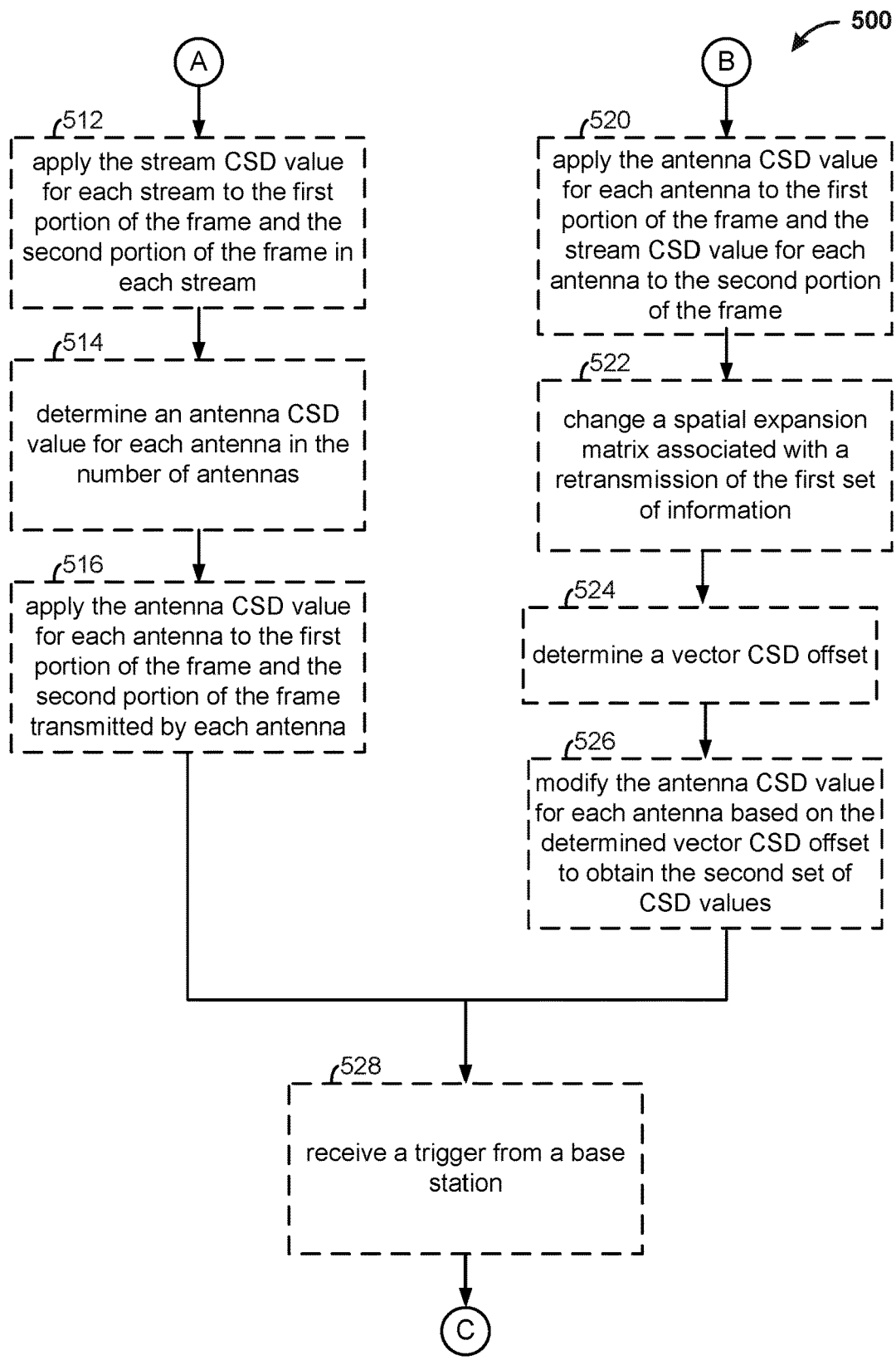
Figure 5C:
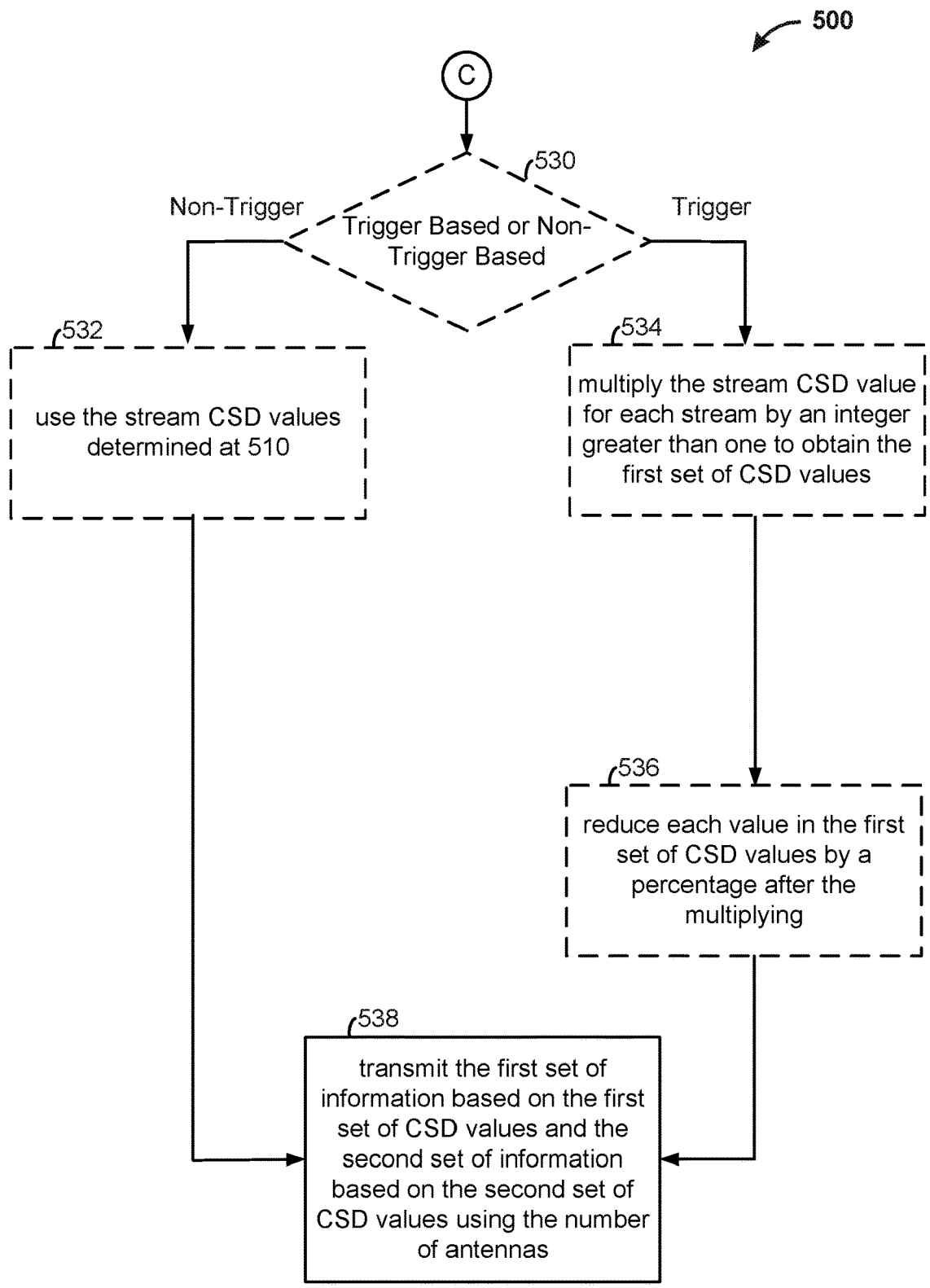

FIGS. 5A-5C are a flowchart of an exemplary method 500 of wireless communication for transmitting information using per antenna and/or per stream CSD values. The method 500 may be performed using an apparatus (e.g., the STA 114, the STA 212, or the wireless device 402, for example). In FIGS. 5A-5C, optional operations are indicated with dotted lines.

Referring to FIG. 5A, at 502, the apparatus may determine if a beam change is equal to zero or one. For example, referring to FIG. 2A, the AP 202 may generate multiple fields of the preamble 285 via various steps (e.g., beamforming/precoding over different training fields), and insert a beam change bit (e.g., TX VECTOR parameter BEAM_CHANGE) in a signal field (e.g., RL-SIG 278, HE-SIG-A 282, and/or HE-SIG-B 284) to indicate to the STA 206, 208, 210, 212, or vice versa, if a beam change has occurred. The AP 202 may then transmit the preamble 285 to the STA 206, 208, 210, 212. The STA 206, 208, 210, 212 may receive the preamble 285, perform channel estimation using the different training fields, and decode the beam change bit (e.g., TX VECTOR parameter BEAM_CHANGE). If the beam change bit is equal to one (e.g., TXVECTOR parameter BEAM_CHANGE=1), then the STA 206, 208, 210, 212 may determine that the channel condition has changed between the different training fields. Alternatively, if the beam change indication bit is equal to zero (e.g., TXVECTOR parameter BEAM_CHANGE=0), then the STA 206, 208, 210, 212 may determine that the channel condition remained the same during the transmission of the different training fields.

At 504, the apparatus may determine whether to transmit a frame with CSDs based on a number of antennas at the station for transmitting the frame, a number of streams used to transmit the frame by the station, or both the number of antennas at the station for transmitting the frame and the number of streams used to transmit the frame by the station. For example, referring to FIG. 2C, when the beam change is equal to zero, the STA 206, 208, 210, 212 may apply a per stream CSD 209, 211 (e.g., see Table 1 supra) to pre-HE modulated fields 280 (e.g., fields 272, 274, 276, 278, 282, 284) and to the HE modulated fields 290 (e.g., fields 286, 288, 292, 294). Optionally, when the beam change is equal to zero, a per antenna CSD (e.g., see Table 2 supra) may additionally be applied to the pre-HE modulated fields 280 and the HE modulated fields 290. Alternatively, when the beam change is equal to one, the STA 206, 208, 210, 212 may apply a per antenna CSD 209 (e.g., see Table 2 supra) to pre-HE modulated fields 280 (e.g., fields 272, 274, 276, 278, 282, 284) and a per stream CSD 211 (e.g., see Table 1 supra) to the HE modulated fields 290 (e.g., fields 286, 288, 292, 294).

At 506, the apparatus may determine a first set of CSD values for transmitting a first set of information associated with a first portion of the frame based on whether it is determined to transmit the frame with the CSDs based on the number of antennas at the station for transmitting the frame, the number of streams used to transmit the frame by the station, or both the number of antennas at the station for transmitting the frame and the number of streams used to transmit the frame by the station. In an aspect, the first portion of the frame includes a pre-HE modulated field of the frame, and the first set of information includes the subfields of the pre-HE modulated field. For example, referring to FIG. 2C, when the beam change is equal to zero, the STA 206, 208, 210, 212 may apply a per stream CSD 209, 211 (e.g., see Table 1 supra) to pre-HE modulated fields 280 (e.g., fields 272, 274, 276, 278, 282, 284). Optionally, when the beam change is equal to zero, a per antenna CSD (e.g., see Table 2 supra) may additionally be applied to the pre-HE modulated fields 280. Alternatively, when the beam change is equal to one, the STA 206, 208, 210, 212 may apply a per antenna CSD 209 (e.g., see Table 2 supra) to pre-HE modulated fields 280 (e.g., fields 272, 274, 276, 278, 282, 284).

At 508, the apparatus may determine a second set of CSD values for transmitting a second set of information associated with a second portion of the frame based on whether it is determined to transmit the frame with the CSDs based on the number of antennas at the station for transmitting the frame, the number of streams used to transmit the frame by the station, or both the number of antennas at the station for transmitting the frame and the number of streams used to transmit the frame by the station. In an aspect, the second portion of the frame is an HE modulated field and/or a data field, and the second set of information includes the subfields of the HE modulate field and/or subfields of the data field. For example, referring to FIG. 2C, when the beam change is equal to zero, the STA 206, 208, 210, 212 may apply a per stream CSD 211 (e.g., see Table 1 supra) to the HE modulated fields 290 (e.g., fields 286, 288, 292, 294). Optionally, when the beam change is equal to zero, a per an antenna CSD may be applied to the HE modulated fields 290 (e.g., fields 286, 288, 292, 294). Alternatively, when the beam change is equal to one, the STA 206, 208, 210, 212 may apply a per stream CSD 211 (e.g., see Table 1 supra) to the HE modulated fields 290 (e.g., fields 286, 288, 292, 294).

When the beam change is equal to zero, at 510, the apparatus may determine a stream CSD value for each stream carrying the same information. In an aspect, the stream CSD value for each stream may be the first set of CSD values for pre-HE modulated fields 280 and the second set of CSD values for HE modulated fields 290. In another aspect, the first set of CSD values is equal to the second set of CSD values. For example, referring to FIG. 2C, when the beam change is equal to zero, the STA 206, 208, 210, 212 may apply the same per stream CSD 209, 211 (e.g., see Table 1 supra) to pre-HE modulated fields 280 (e.g., fields 272, 274, 276, 278, 282, 284) and to the HE modulated fields 290 (e.g., fields 286, 288, 292, 294).

Referring to FIG. 5B, when the beam change is equal to zero, at 512, the apparatus may apply the stream CSD value for each stream to the first portion of the frame and the second portion of the frame in each stream. For example, referring to FIG. 2A, when the beam change is equal to zero, the STA 206, 208, 210, 212 may determine to transmit a frame with a CSD determined on a per stream basis where the same frame is copied over to different streams and each of the different streams is transmitted from a group of antennas using one of the CSD values listed above in Table 1. In such a configuration, the applied CSD may be equal to $CSD_s$, where $CSD_s$ is one of the values listed above in Table 1 depending on which stream s is being transmitted. The STA 206, 208, 210, 212 may apply a different per stream $CSD_s$ to each of the different streams. In an aspect, each of the subfields (e.g., 272, 274, 276, 278, 282, 284, 286, 288, 292, 294) in a particular stream s may be transmitted with the same per stream $CSD_s$. Referring to FIG. 2C, when the beam change is equal to zero, the STA 206, 208, 210, 212 may apply a per stream CSD 209, 211 (e.g., see Table 1 supra) to pre-HE modulated fields 280 (e.g., fields 272, 274, 276, 278, 282, 284) and to the HE modulated fields 290 (e.g., fields 286, 288, 292, 294).

When the beam change is equal to zero, at 514, the apparatus may determine an antenna CSD value for each antenna in the number of antennas. For example, referring to FIG. 2A, when the beam change is equal to zero, the STA 206, 208, 210, 212 may also determine a particular stream s may be transmitted from an antenna i based on a determined CSD equal to $CSD_s+CSD_i$. For example, $CSD_s$ may be determined based on the values listed above in Table 1, and $CSD_i$ may be determined based on the values listed above in Table 2. Referring to FIG. 2C, a per antenna CSD may additionally be applied to the pre-HE modulated fields 280 and the HE modulated fields 290. When the TXVECTOR parameter BEAM_CHANGE is 0, the per antenna CSD value $T_{CS}^{iTX}$ (e.g., see Table 2 above) for the L-STF 272, L-LTF 274, L-SIG 276, RL-SIG 278, and HE-SIG-A 282 fields may not be specified.

When the beam change is equal to zero, at 516, the apparatus may apply the antenna CSD value for each antenna to the first portion of the frame and the second portion of the frame transmitted by each antenna. For example, referring to FIG. 2A, For example, referring to FIG. 2A, when the beam change is equal to zero, the STA 206, 208, 210, 212 may also determine to transmit the frame with a CSD determined on a per antenna basis. In such a configuration, a particular stream s may be transmitted from an antenna i based on a CSD equal to $CSD_s+CSD_i$. In an aspect of such a configuration, each of the subfields (e.g., 272, 274, 276, 278, 282, 284, 286, 288, 292, 294) in a particular stream s may be transmitted from antenna i based on a CSD equal to $CSD_s+CSD_i$. Referring to FIG. 2C, Optionally, a per antenna CSD may additionally be applied to the pre-HE modulated fields 280 and the HE modulated fields 290.

Referring again to FIG. 5A, when the beam change is equal to one, at 518, the apparatus may determine an antenna CSD value for each antenna in the number of antennas and a stream CSD value for each antenna in the number of antennas. For example, referring to FIG. 2C, when the beam change is equal to one, the STA 206, 208, 210, 212 may apply a per stream CSD 209 (e.g., see Table 1 supra) to pre-HE modulated fields 280 (e.g., fields 272, 274, 276, 278, 282, 284) and a per antenna CSD 211 (e.g., see Table 2 supra) to the HE modulated fields 290 (e.g., fields 286, 288, 292, 294).

Referring to FIG. 5B, when the beam change is equal to one, at 520, the apparatus may apply the antenna CSD value for each antenna to the first portion of the frame and the stream CSD value for each antenna to the second portion of the frame. For example, referring to FIG. 2C, when the beam change is equal to one, the STA 206, 208, 210, 212 may apply a per stream CSD 209 (e.g., see Table 1 supra) to pre-HE modulated fields 280 (e.g., fields 272, 274, 276, 278, 282, 284) and a per antenna CSD 211 (e.g., see Table 2 supra) to the HE modulated fields 290 (e.g., fields 286, 288, 292, 294).

When the beam change is equal to one, at 522, the apparatus may change a spatial expansion matrix associated with a retransmission of the first set of information. For example, referring to FIGS. 2A-2C, the per antenna CSD values may be applied randomly for each transmission from the STAs 206, 208, 210, 212 to the AP 202. Any correlation issues in which the AP 202 is unable to assign a transmission to a particular STA 206, 208, 210, 212 may be resolved by retransmissions by the STAs 206, 208, 210, 212. Alternatively, the STAs 206, 208, 210, 212 may change the spatial expansion matrix in a retransmission. In an aspect, the spatial expansion matrix may be determined based on implementation and may include extra CSD values per transmission chain.

When the beam change is equal to one, at 524, the apparatus may determine a vector CSD offset. For example, referring to FIGS. 2A-2C, the per antenna CSD values may be increased to provide sufficient diversity to be captured by the AP 202. For example, the CSD values may be increased by a factor of four to obtain new CSD values (e.g., CSD_new). The new CSD values may be equal to four multiplied by the CSD values plus a vector offset (e.g., CSD_new=4*CSD_11ac+$\Delta_{1\times8}$). The new CSD values may be applied to both HE-STF symbol 286 and the data symbols in the data field 292, as well as other symbols and fields. The CSD values may be, for example,[0 −400 −200 −600 −350 −650 −100 −750] ns (e.g., as seen above in Table 1). The vector offset $\Delta_{1\times8}$ may be necessary to prevent degrading STF performance. The effective CSD applied to the STF (e.g., CSD_STF) may be different for a trigger based frame and a non-trigger based frame (e.g., CSD_STF= mod(CSD_new, STF_period)). For example, the STF_period may be equal to 0.8 µs for a non-trigger based frame or 1.6 µs for a trigger based frame. By way of example, if the vector offset $\Delta_{1\times8}$ is equal to [0 −400 −200 −600 +250 −450 +300 −150], then CSD_new is equal to [0 −2000 −1000 −3000 −1150 −3050 −100 −3150] ns. Thus, for a non-trigger based frame with a periodicity of 0.8 µs the CSD_STF is equal to [0 −400 −200 −600 −350 −650 −100 −750 ns] (e.g., which is equal to the CSD values seen in Table 1). However, for a trigger based frame with a periodicity of 1.6 µs the CSD_STF is equal to [0 −400 −1000 −1400 −1150 −1450 −100 −1550] ns.

When the beam change is equal to one, at 526, the apparatus may modify the antenna CSD value for each antenna based on the determined vector CSD offset to obtain the second set of CSD values. For example, referring to FIGS. 2A-2C, the per antenna CSD values may be increased to provide sufficient diversity to be captured by the AP 202. For example, the CSD values may be increased by a factor of four to obtain new CSD values (e.g., CSD_new). The new CSD values may be equal to four multiplied by the CSD values plus a vector offset (e.g., CSD_new=4*CSD_11ac+ $\Delta_{1\times8}$). The new CSD values may be applied to both HE-STF symbol 286 and the data symbols in the data field 292, as well as other symbols and fields. The CSD values may be, for example, [0 −400 −200 −600 −350 −650 −100 −750] ns (e.g., as seen above in Table 1). The vector offset $\Delta_{1\times8}$ may be necessary to prevent degrading STF performance. The effective CSD applied to the STF (e.g., CSD_STF) may be different for a trigger based frame and a non-trigger based frame (e.g., CSD_STF=mod(CSD_new, STF_period)). For example, the STF_period may be equal to 0.8 µs for a non-trigger based frame or 1.6 µs for a trigger based frame. By way of example, if the vector offset $\Delta_{1\times8}$ is equal to [0 −400 −200 −600 +250 −450 +300 −150], then CSD_new is equal to [0 −2000 −1000 −3000 −1150 −3050 −100 −3150] ns. Thus, for a non-trigger based frame with a periodicity of 0.8 µs the CSD_STF is equal to [0 −400 −200 −600 −350 −650 −100 −750] ns (e.g., which is equal to the CSD values seen in Table 1). However, for a trigger based frame with a periodicity of 1.6 µs the CSD_STF is equal to [0 −400 −1000 −1400 −1150 −1450 −100 −1550] ns.

At 528, the apparatus may receive a trigger from the base station. In an aspect, the trigger may include an index based on a number of streams or a number of antennas allocated in an uplink multi-user multiple-input multiple-output scenario. In another aspect, the index may be one of a global index or a local index. In a further aspect, the first set of CSD values may be determined based on the index. For example, referring to FIG. 2A, the AP 202 may transmit a trigger message 216 to the STA 212 (and to the STAs 206, 208, 210). The trigger message 216 may include configuration information that the STA 212 may use for transmitting a frame to the AP 202.

At 530, the apparatus may determine whether the frame is a trigger-based frame or a non-trigger based frame. For example, referring to FIG. 2A, a first HE-STF mode, a periodicity of 0.8 µs with five periods (e.g., five STF short symbols) for a non-triggered frame (e.g., a frame that is transmitted based on a trigger received from the AP 202) may be allowed (e.g., 0.8 µs HE-STF). In a second HE-STF mode, a periodicity of 1.6 µs with five periods (e.g., five STF short symbols) for a trigger based frame (e.g., a frame that is transmitted based on a trigger 216 received from the AP 202) may be allowed (e.g., 1.6 µs HE-STF).

When the frame is a non-trigger based frame, at 532, the apparatus may apply the stream CSD values determined at 510 to the first set of information associated with the first portion of the frame and to the second set information associated with the second portion of the frame. For example, referring to FIGS. 2A-2C, when a STA determines that a beam change is equal to zero and that there is a frame to be transmitted that is not based on a trigger, the STA determines to transmit the frame (e.g., pre-HE modulated fields 280 and HE modulated fields 290) with CSDs determined based on a per stream basis. When the STA transmits a frame with a particular per stream CSD, each subfield (e.g., fields 272, 274, 276, 278, 282, 284, 286, 288, 292, 294) in the frame is transmitted with that particular per stream CSD. The STA determines how many additional n streams may be used to transmit the same frame (e.g., the same information). Assume n is equal to 7 such that the STA determines to transmit the frame in eight different streams—stream A (e.g., stream 1 in Table 1 supra), stream B (e.g., stream 2 in Table 1 supra), stream C (e.g., stream 3 in Table 1 supra), stream D (e.g., stream 4 in Table 1 supra), stream E (e.g., stream 5 in Table 1 supra), stream F (e.g., stream 6 in Table 1 supra), stream G (e.g., stream 7 in Table 1 supra), and stream H (e.g., stream 8 in Table 1 supra).

When the frame is a trigger based frame, at 534, the apparatus may multiply the stream CSD value for each stream by an integer greater than one to obtain the first set of CSD values. For example, referring to FIGS. 2A-2C, the HE modulated fields 290 may be transmitted in spatial streams with a per stream CSD when the frame 250 is a trigger based frame. For example, with respect to FIG. 3, the STA 350 may determine and/or identify eight spatial streams—stream A (e.g., stream 1 in Table 1), stream B (e.g., stream 2 in Table 1), stream C (e.g., stream 3 in Table 1), stream D (e.g., stream 4 in Table 1), stream E (e.g., stream 5 in Table 1), stream F (e.g., stream 6 in Table 1), stream G (e.g., stream 7 in Table 1), and stream H (e.g., stream 8 in Table 1)—for transmitting the second set of information associated with the HE modulated fields 290. In a first option, the trigger based frame may have double the STF periodicity (e.g., 1.6 µs HE-STF) as compared to the non-trigger based frame (e.g., 0.8 µs HE-STF). In this option, the CSD values (e.g., listed above in Table 1) for the trigger based frame may be doubled. For example, the STA 350 may determine a per stream CSD value for each of stream A, stream B, stream C, stream D, stream E, stream F, stream G, and stream H by doubling the CSD values used for the non-trigger based frame described previously. For example, stream A may be given a 0 ns CSD value, stream B may be given a −800 ns CSD value, stream C may be given a −400 ns CSD value, stream D may be given a −1200 ns CSD value, stream E may be given a −700 ns CSD value, stream F may be given a −1300 ns CSD value, stream G may be give a −200 ns value, and stream H may be given a −1500 ns stream value. Accordingly, stream A may be transmitted at time 0, stream B may be transmitted with a 800 ns cyclic delay compared to stream A, stream C may be transmitted with a 400 ns cyclic delay compared to stream A, stream D may be transmitted with a 1200 ns cyclic delay compared to stream A, stream E may be transmitted with a 700 cyclic delay compared to stream A, stream F may be transmitted with a 1300 cyclic delay compared to stream A, stream G may be transmitted with a 200 ns cyclic delay compared to stream A, and stream H may be transmitted with a 1500 cyclic delay compared to stream A.

Referring to FIG. 5C, when the frame is a trigger based frame, at 536, the apparatus may reduce each value in the first set of CSD values by a percentage after the multiplying. For example, FIGS. 2A-2C, to reduce the mathematical complexity of implementing a frequency domain application of CSD, the per stream CSD values for the 8 streams discussed above with respect to Option 1 may be rounded down (e.g., by a percentage) before being applied to each stream. For example, each of the CSD values may be rounded down to 1.6 µs/8 such that stream A may be given a 0 ns CSD value, stream B may be given a −800 ns CSD value, stream C may be given a −400 ns CSD value, stream D may be given a −1000 ns CSD value, stream E may be given a −600 ns CSD value, stream F may be given a −1200 ns CSD value, stream G may be give a −200 ns value, and stream H may be given a −1400 ns stream value.

At 538, the apparatus may transmit the first set of information based on the first set of CSD values and the second set of information based on the second set of CSD values using the number of antennas, the number of streams, or both the number of antennas and the number of streams. For example, referring to FIG. 2A, when the beam change is equal to zero, the STA 206, 208, 210, 212 may determine to transmit a frame with a CSD determined on a per stream basis where the same frame is copied over to different streams and each of the different streams is transmitted from a group of antennas using one of the CSD values listed above in Table 1. In such a configuration, the applied CSD may be equal to $CSD_s$, where $CSD_s$ is one of the values listed above in Table 1 depending on which stream s is being transmitted. The STA 206, 208, 210, 212 may apply a different per stream $CSD_s$ to each of the different streams. In an aspect, each of the subfields (e.g., 272, 274, 276, 278, 282, 284, 286, 288, 292, 294) in a particular stream s may be transmitted with the same per stream $CSD_s$. In addition, when the beam change is equal to zero, the STA 206, 208, 210, 212 may also determine to transmit the frame with a CSD determined on a per antenna basis. In such a configuration, a particular stream s may be transmitted from an antenna i based on a CSD equal to $CSD_s+CSD_i$. In an aspect of such a configuration, each of the subfields (e.g., 272, 274, 276, 278, 282, 284, 286, 288, 292, 294) in a particular stream s may be transmitted from antenna i based on a CSD equal to $CSD_s+CSD_i$. Alternatively, when the beam change is equal to one, the STA 206, 208, 210, 212 may determine to transmit the pre-HE modulated fields 280 with a CSD determined per antenna (e.g., see Table 2 supra) and the HE modulated fields 290 with a CSD determined per stream (e.g., see Table 1 supra). When the beam change is equal to one, only one stream may be transmitted for the pre-HE modulated fields 280 and multiple streams may be transmitted for the HE modulated fields 290. When the beam change is equal to one, different per antenna CSDs are applied to the one stream depending on from which antenna the stream is being transmitted for the pre-HE modulated fields 280. As such, each subfield for that one stream is being transmitted with a CSD equal to $CSD_i$ from antenna i, where $CSD_i$ is found above in Table 2. When beam change is equal to one, the STA 206, 208, 210, 212 may determine to transmit the HE modulated fields 290 with a CSD determined on a per stream basis where the same HE modulated fields 290 are copied over to different streams and each of the different streams is transmitted from a group of antennas using one of the CSD values listed above in Table 1. In such a configuration, the applied CSD may be equal to $CSD_s$, where $CSD_s$ is one of the values listed above in Table 1 depending on which stream s is being transmitted. The STA 206, 208, 210, 212 may apply a different per stream $CSD_s$ to each of the different streams for the HE modulated fields 290. In an aspect, each of the subfields (e.g., 286, 288, 292, 294) of the HE modulated fields 290 in a particular stream s may be transmitted with the same per stream $CSD_s$.

Figure 6:
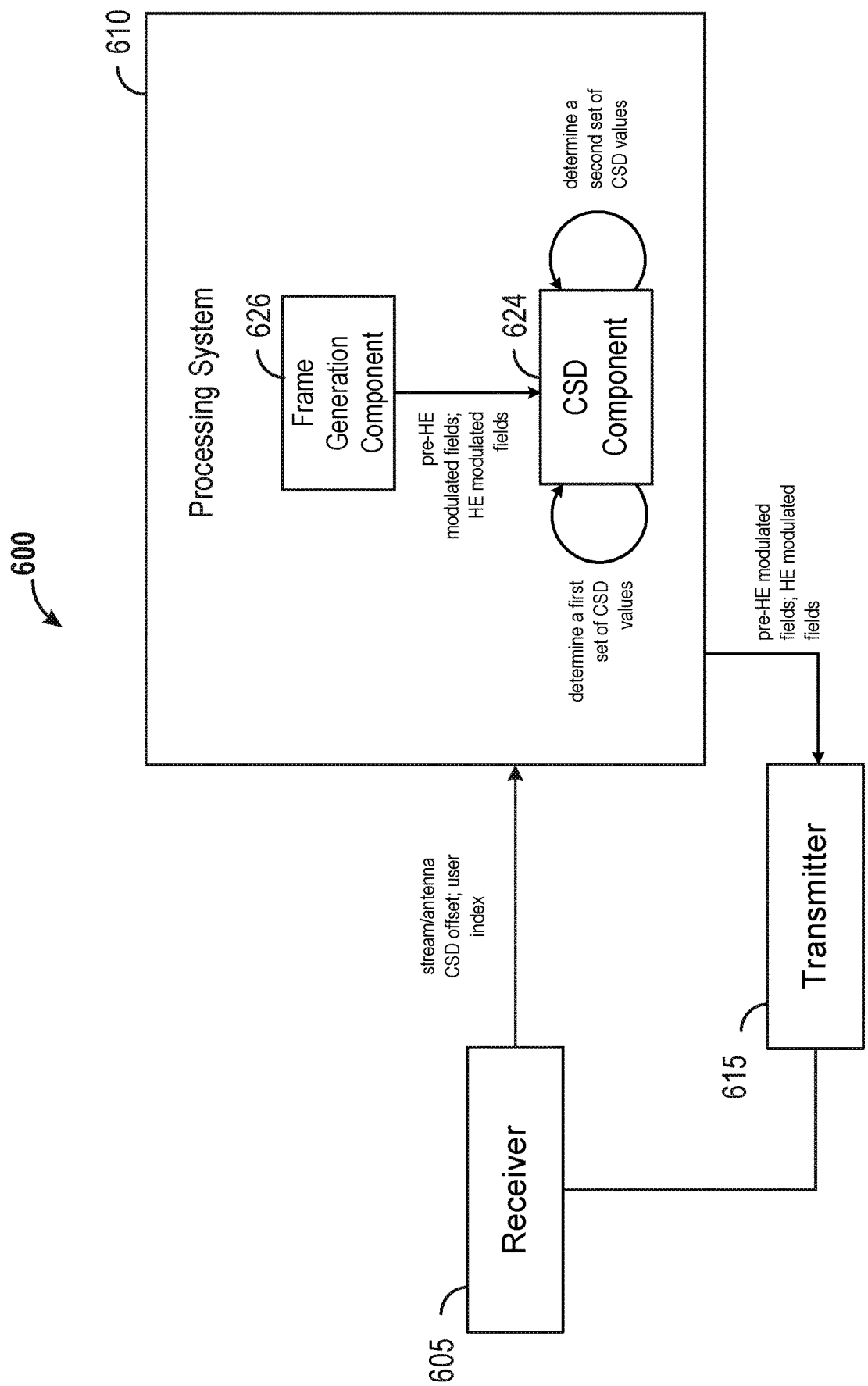
FIG. 6 is a functional block diagram of an exemplary wireless communication device for transmitting information using per antenna and/or per stream CSD values.

FIG. 6 is a functional block diagram of an exemplary wireless communication device 600 for transmitting information using per antenna and/or per stream CSD values. The wireless communication device 600 may include a receiver 605, a processing system 610, and a transmitter 615. The processing system 610 may include a CSD component 624 and/or a frame generation component 626. In an aspect, the frame generation component 626 may be configured to generate a frame to be transmitted. The frame generation component 626 may generate pre-HE modulated fields and HE modulated fields associated with a frame to be transmitted. The frame generation component 626 may provide the frame to be transmitted to the CSD component 624. In one configuration, the processing system 610 and/or the CSD component 624 may be configured to determine whether to transmit a frame with CSDs based on a number of antennas at the station for transmitting the frame, a number of streams used to transmit the frame by the station, or both the number of antennas at the station for transmitting the frame and the number of streams used to transmit the frame by the station. In another configuration, processing system 610 and/or the CSD component 624 may be configured to determine a first set of CSD values for transmitting a first set of information associated with a first portion of the frame based on whether it is determined to transmit the frame with the CSDs based on the number of antennas at the station for transmitting the frame, the number of streams used to transmit the frame by the station, or both the number of antennas at the station for transmitting the frame and the number of streams used to transmit the frame by the station. In an aspect, the first portion of the frame may include a pre-HE modulated field. In a further configuration, processing system 610 and/or the CSD component 624 may be configured to determine a second set of CSD values for transmitting a second set of information associated with a second portion of the frame based on whether it is determined to transmit the frame with the CSDs based on the number of antennas at the station for transmitting the frame, the number of streams used to transmit the frame by the station, or both the number of antennas at the station for transmitting the frame and the number of streams used to transmit the frame by the station. In an aspect, the second portion of the frame is an HE modulated field or a data field. In one configuration, processing system 610 and/or the CSD component 624 may be configured to determine if a beam change is equal to zero or one. In another configuration, processing system 610 and/or the CSD component 624 may be configured to determine a stream CSD value for each stream in the number of streams when the beam change is equal to zero. In an aspect, the stream CSD value for each stream may be the first set of CSD values and the second set of CSD values. In a further configuration, processing system 610 and/or the CSD component 624 may be configured to apply the stream CSD value for each stream to the first portion of the frame and the second portion of the frame. In one configuration, processing system 610 and/or the CSD component 624 may be configured to determine an antenna CSD value for each antenna in the number of antennas. In another configuration, processing system 610 and/or the CSD component 624 may be configured to determine an antenna CSD value for each antenna in the number of antennas and a stream CSD value for each antenna in the number of antennas when the beam change is equal to one. In an aspect, the antenna CSD value for each antenna may be the first set of CSD values and the stream CSD value for each stream may be the second set of CSD values. In a further configuration, processing system 610 and/or the CSD component 624 may be configured to apply the antenna CSD value for each antenna to the first portion of the frame and the stream CSD value for each antenna to the second portion of the frame. In one configuration, processing system 610 and/or the CSD component 624 may be configured to determine whether the frame is a trigger-based frame or a non-trigger based frame. In another configuration, processing system 610 and/or the CSD component 624 may be configured to multiply the stream CSD value for each stream by an integer greater than one to obtain the first set of CSD values when it is determined that the frame is trigger based. In a further configuration, processing system 610 and/or the CSD component 624 may be configured to reduce each value in the first set of CSD values by a percentage after multiplying. In one configuration, processing system 610 and/or the CSD component 624 may be configured to determine a vector CSD offset. In another configuration, processing system 610 and/or the CSD component 624 may be configured to modify the antenna CSD value for each antenna based on the determined vector CSD offset to obtain the second set of CSD values. In an aspect, each per antenna CSD value may be randomly applied. In one configuration, processing system 610 and/or the CSD component 624 may be configured to change a spatial expansion matrix associated with a retransmission of the first set of information. In another configuration, processing system 610 and/or the CSD component 624 may be configured to receive a trigger from a base station. In an aspect, the trigger may include an index based on a number of streams or a number of antennas allocated in an uplink multi-user multiple-input multiple-output scenario. In another aspect, the index may be one of a global index or a local index. In a further aspect, the first set of CSD values may be determined based on the index.

The receiver 605, the processing system 610, the CSD component 624, the frame generation component 626, and/or the transmitter 615 may be configured to perform one or more functions discussed above with respect to blocks 605, 610, 615, and 620 of FIG. 6. The receiver 605 may correspond to the receiver 412. The processing system 610 may correspond to the processor 504. The transmitter 615 may correspond to the transmitter 410. The CSD component 624 may correspond to the CSD component 124 and/or the CSD component 424.

As described supra, a STA may transmit a frame (e.g., signal) to an AP using a number of antennas, a number of streams, or both a number of antennas and a number of streams. However, because different streams and/or by different antennas may be used to transmit the signal using the same channel, unintentional beamforming may result when the signals received at the AP are opposite in phase. To avoid unintentional beamforming, the STA of the present disclosure may apply a CSD for each stream and/or antenna used to transmit the frame so that the channels may be differentiated by the AP.

For example, when the beam change is equal to zero, the STA 206, 208, 210, 212 of the present disclosure may determine to transmit a frame with a CSD determined on a per stream basis where the same frame is copied over to different streams and each of the different streams is transmitted from a group of antennas using one of the CSD values listed above in Table 1. In such a configuration, the applied CSD may be equal to $CSD_s$, where $CSD_s$ is one of the values listed above in Table 1 depending on which stream s is being transmitted. The STA 206, 208, 210, 212 may apply a different per stream $CSD_s$ to each of the different streams. In an aspect, each of the subfields (e.g., 272, 274, 276, 278, 282, 284, 286, 288, 292, 294) in a particular stream s may be transmitted with the same per stream $CSD_s$. In addition, when the beam change is equal to zero, the STA 206, 208, 210, 212 may also determine to transmit the frame with a CSD determined on a per antenna basis. In such a configuration, a particular stream s may be transmitted from an antenna i based on a CSD equal to $CSD_s+CSD_i$. In an aspect of such a configuration, each of the subfields (e.g., 272, 274, 276, 278, 282, 284, 286, 288, 292, 294) in a particular stream s may be transmitted from antenna i based on a CSD equal to $CSD_s+CSD_i$.

Alternatively, when the beam change is equal to one, the STA 206, 208, 210, 212 of the present disclosure may determine to transmit the pre-HE modulated fields 280 with a CSD determined per antenna (e.g., see Table 2 supra) and the HE modulated fields 290 with a CSD determined per stream (e.g., see Table 1 supra). When the beam change is equal to one, only one stream may be transmitted for the pre-HE modulated fields 280 and multiple streams may be transmitted for the HE modulated fields 290. When the beam change is equal to one, different per antenna CSDs are applied to the one stream depending on from which antenna the stream is being transmitted for the pre-HE modulated fields 280. As such, each subfield for that one stream is being transmitted with a CSD equal to $CSD_i$ from antenna i, where $CSD_i$ is found above in Table 2. When beam change is equal to one, the STA 206, 208, 210, 212 may determine to transmit the HE modulated fields 290 with a CSD determined on a per stream basis where the same HE modulated fields 290 are copied over to different streams and each of the different streams is transmitted from a group of antennas using one of the CSD values listed above in Table 1. In such a configuration, the applied CSD may be equal to $CSD_s$, where $CSD_s$ is one of the values listed above in Table 1 depending on which streams is being transmitted. The STA 206, 208, 210, 212 may apply a different per stream $CSD_s$ to each of the different streams for the HE modulated fields 290. In an aspect, each of the subfields (e.g., 286, 288, 292, 294) of the HE modulated fields 290 in a particular stream s may be transmitted with the same per stream $CSD_s$.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, components and circuits described in connection with the present disclosure may be implemented or performed with a general purpose processor, a DSP, an application specific integrated circuit (ASIC), an FPGA or other PLD, discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, compact disk (CD)-ROM (CD-ROM) or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, digital versatile disc (DVD), floppy disk and Blu-ray disc where disks usually reproduce data magnetically, while discs reproduce data optically with lasers. Thus, computer readable medium comprises a non-transitory computer readable medium (e.g., tangible media).

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Further, it should be appreciated that components and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for."

What is claimed is:

1. A method of wireless communication for a first apparatus, comprising:
    obtaining a beam change value;
    determining a first set of cyclic shift delay (CSD) values on a per antenna basis based on the beam change value;
    determining a second set of CSD values on a per stream basis based on the beam change value;
    applying the first set of CSD values to a first portion of a frame and applying the second set of CSD values to a second portion of the frame;
    selecting a spatial expansion matrix from a plurality of spatial expansion matrices based on a number of streams used to transmit the frame; and
    transmitting the frame based on the selected spatial expansion matrix.

2. The method of claim 1, wherein the first portion of the frame precedes the second portion of the frame.

3. The method of claim 1, further comprising:
    modifying each one of the first set of CSD values based on a vector CSD offset.

4. The method of claim 1, further comprising:
    determining whether to perform channel estimation enhancement based on the beam change value.

5. The method of claim 1, further comprising:
    changing the spatial expansion matrix for a retransmission of the frame.

6. The method of claim 1, wherein the first portion of the frame includes a pre-high-efficiency (pre-HE) modulated field, and a second portion of the frame includes an HE modulated field or a data field.

7. An apparatus for wireless communication, comprising:
    a memory; and
    at least one processor coupled to the memory and configured to:
        obtain a beam change value;
        determine a first set of cyclic shift delay (CSD) values on a per antenna basis based on the beam change value;
        determine a second set of CSD values on a per stream basis based on the beam change value;
        apply the first set of CSD values to a first portion of a frame and apply the second set of CSD values to a second portion of the frame;
        select a spatial expansion matrix from a plurality of spatial expansion matrices based on a number of streams used to transmit the frame; and
        transmitting the frame based on the selected spatial expansion matrix.

8. The apparatus of claim 7, wherein the first portion of the frame precedes the second portion of the frame.

9. The apparatus of claim 7, wherein the at least one processor is further configured to:
    modify each one of the first set of CSD values based on a vector CSD offset.

10. The apparatus of claim 7, wherein the at least one processor is further configured to:
    determine whether to perform channel estimation enhancement based on the beam change value.

11. The apparatus of claim 7, wherein the at least one processor is further configured to:
    change the spatial expansion matrix for a retransmission of the frame.

12. The apparatus of claim 7, wherein the first portion of the frame includes a pre-high-efficiency (pre-HE) modulated field, and a second portion of the frame includes an HE modulated field or a data field.

13. An apparatus for wireless communication, comprising:
    means for obtaining a beam change value;
    means for determining a first set of cyclic shift delay (CSD) values on at least one of a per stream or per antenna basis based on the beam change value;
    means for determining a second set of CSD values on a per stream basis based on the beam change value;
    wherein the first set of CSD values are determined on a per antenna basis;
    means for applying the first set of CSD values to at least a first portion of a frame and applying the second set of CSD values to a second portion of the frame;
    means for selecting a spatial expansion matrix from a plurality of spatial expansion matrices based on a number of streams used to transmit the frame; and
    means for transmitting the frame based on the selected spatial expansion matrix.

14. The apparatus of claim 13, wherein the first portion of the frame precedes the second portion of the frame.

15. The apparatus of claim 13, further comprising:
means for modifying each one of the first set of CSD values based on a vector CSD offset.

16. The apparatus of claim 13, further comprising:
means for determining whether to perform channel estimation enhancement based on the beam change value.

17. A non-transitory, computer-readable medium storing computer-executable code for wireless communication by an apparatus, the code when executed by a processor cause the processor to:
obtain a beam change value;
determine a first set of cyclic shift delay (CSD) values on a per antenna basis based on the beam change value;
determine a second set of CSD values on a per stream basis based on the beam change value;
apply the first set of CSD values to a first portion of a frame and apply the second set of CSD values to a second portion of the frame;
select a spatial expansion matrix from a plurality of spatial expansion matrices based on a number of streams used to transmit the frame; and
transmit the frame based on the selected spatial expansion matrix.

* * * * *